United States Patent
Kikuma et al.

(10) Patent No.: US 7,027,816 B2
(45) Date of Patent: Apr. 11, 2006

(54) METHOD FOR CHANGING OVER TO DIFFERENT FREQUENCY AT CELLULAR PHONE SYSTEM AND CELLULAR PHONE SYSTEM USING THE METHOD AND BASE STATION CONTROLLING APPARATUS IN THE SYSTEM AND MOBILE COMMUNICATION TERMINAL IN THE SYSTEM

(75) Inventors: Tomohiro Kikuma, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 246 days.

(21) Appl. No.: 10/617,744

(22) Filed: Jul. 14, 2003

(65) Prior Publication Data

US 2004/0029588 A1 Feb. 12, 2004

(30) Foreign Application Priority Data

Jul. 15, 2002 (JP) ............................. 2002-205077

(51) Int. Cl.
*H04Q 7/20* (2006.01)
*H04Q 11/00* (2006.01)
*H04L 12/50* (2006.01)

(52) U.S. Cl. ...................................... 455/444; 370/331

(58) Field of Classification Search ................ 455/444, 455/436; 370/331
See application file for complete search history.

(56) References Cited

U.S. PATENT DOCUMENTS 6,208,863 B1* 3/2001 Salonaho ..................... 455/444
6,801,511 B1* 10/2004 Park ........................... 370/331

* cited by examiner

*Primary Examiner*—William D. Cumming
(74) *Attorney, Agent, or Firm*—Young & Thompson

(57) ABSTRACT

A method for changing over to different frequency in a cellular phone system, in which lowering the probability generating a call drop and decreasing the power consumption when the moving velocity of a mobile communication terminal connecting a micro-cell becomes high can be realized. A judging threshold value Th_HO using at the changing over to the different frequency is changed corresponding to the moving velocity of the mobile communication terminal. When the moving velocity of the mobile communication terminal connecting to a micro-cell becomes high, the judging threshold value Th_HO is changed to be a small value, and the probability changing over to the different frequency is made to be high, and it makes easy for the mobile communication terminal to connect to a macro-cell. With this, the probability generating the call drop can be decreased.

10 Claims, 10 Drawing Sheets

METHOD FOR CHANGING OVER TO DIFFERENT FREQUENCY AT CELLULAR PHONE SYSTEM AND CELLULAR PHONE SYSTEM USING THE METHOD AND BASE STATION CONTROLLING APPARATUS IN THE SYSTEM AND MOBILE COMMUNICATION TERMINAL IN THE SYSTEM

BACKGROUND OF THE INVENTION

The present invention relates to a method for changing over to a different frequency at a cellular phone system, and a cellular phone system using the method, and a base station controlling apparatus in the system, and a mobile communication terminal in the system, in particular, in which the method for changing over to a different frequency is improved at a CDMA (code division multiple access) system.

Description of the Related Art

At a cellular phone system using a CDMA system, in order to keep the channel capacity in the high level, its transmission power is controlled. Generally, the transmission power is controlled by using a value of SIR (signal to interference power ratio) showing in the following equation (1).

$$SIR=S/(I+N) \quad (1)$$

In this, the S signifies desiring wave signal power, the I signifies interference power per band, and the N signifies noise power per band.

At the control of the transmission power, the reception side measures the reception SIR shown in the equation (1). When the measured result is smaller than a target SIR, the reception side requires the transmission side to increase the transmission power, and when the measured result is larger than the target SIR, the reception side requires the transmission side to decrease the transmission power. With this, its channel quality can be controlled in a certain value and the channel capacity can be kept in the high level.

And at the cellular phone system using the CDMA system, a soft hand-over technology, in which a mobile communication terminal connects to plural base stations at the same time, is important. At the soft hand-over technology, a mobile communication terminal cyclically measures reception power in broadcast channels transmitting from base stations in a cell, where the mobile communication terminal exists, and from a base station in an adjacent cell. And the maximum value in the measured reception power in the broadcast channels is made to be a reference, and the mobile communication terminal connects its channels to base stations that transmitted the broadcast channels whose reception power is within a threshold value from the maximum value (reference). With this, the mobile communication terminal connects to the plural base stations at the same time. In this, hereinafter, this threshold value is referred to as an active set threshold value.

In case that a mobile communication terminal is in a position near a base station, the propagation loss between the mobile communication terminal and the base station is small enough, compared with the propagation loss between the mobile communication terminal and a base station in an adjacent cell. And the reception power in the broadcast channel transmitting from the base station near the mobile communication terminal becomes the maximum value. And the difference between the reception power in the broadcast channels from the base station near the mobile communication terminal and the base station in the adjacent cell becomes larger than the active set threshold value. Therefore, the mobile communication terminal connects its channel only to the base station near the mobile communication terminal.

In case that a mobile communication terminal is in a position at the end of a cell of a base station, the propagation loss between the mobile communication terminal positioned at the end of the cell and the base station and the propagation loss between the mobile communication terminal and a base station in an adjacent cell become almost equal. Therefore, the difference of the reception power in the broadcast channels transmitting from the base station positioned at the end of the cell and from the base station in the adjacent cell becomes small. Consequently, the mobile communication terminal receives plural broadcast channels within the active set threshold value, and the mobile communication terminal connects its channels to the plural base stations at the same time. As mentioned above, by using the soft hand-over technology, the channel of the mobile communication terminal does not disconnect even while the mobile communication terminal is moving from a cell to an adjacent cell.

Further, at the cellular phone system using the CDMA system, in case that plural carrier frequencies are allocated, a technology, which changes over its carrier frequency to a different carrier frequency, is important.

Generally, this technology for changing over to the different frequency is a technology to make the frequency utilization efficiency high, and has a purpose that a call drop phenomenon caused by the deterioration of the channel quality in the currently using carrier frequency is avoided.

First, the technology changing over to the different frequency is explained in the viewpoint of the system structure. In the explanation of prior arts, drawings showing in FIGS. 1 to 4, which are the drawings using at embodiments of the present invention, are used.

In FIG. 1, the structure of a cellular phone system, in which two carrier frequencies are used in one service area, is shown. In FIG. 2, the positions of the carrier frequencies in the upstream channel and the downstream channel are shown.

Base stations 10, 11, 20, and 21, mobile communication terminals 30, 31, and 32, and a base station controlling apparatus 60, which controls the base stations, are shown in FIG. 1.

In FIG. 1, the mobile communication terminal 30 can connect its channel to any of base stations 10, 11, 20, and 21. The carrier frequencies, which the mobile communication terminal 30 uses in the channel with the base stations 10 and 11, is a carrier frequency 101 at the upstream channel, and a carrier frequency 103 at the downstream channel shown in FIG. 2. And the carrier frequencies, which the mobile communication terminal 30 uses in the channel with the base stations 20 and 21, is a carrier frequency 102 at the upstream channel and a carrier frequency 104 at the downstream channel shown in FIG. 2.

And the judgement changing over to the different frequency, whether the mobile communication terminal 30 connects to the base stations 10 and 11 or the base stations 20 and 21 during its communication, is controlled by the base station controlling apparatus 60 or the mobile communication terminal 30. And also the base station controlling apparatus 60 or the mobile communication terminal 30 executes the control changing over to the different frequency. In FIG. 1, broadcast channels 40 and 41, downstream individual channels 50 and 51, and upstream individual channels 70 and 71 are also shown.

Next, a conventional method for changing over to a different frequency is explained. At this conventional method for changing over to the different frequency, the control changing over to the different frequency is executed corresponding to the reception quality at the broadcast channels.

In FIG. 1, it is assumed that the channel of the mobile communication terminal 30 has been connected to the base station 10 as the initial state. At this time, at the downstream channel of the mobile communication terminal 30, the currently using carrier frequency is 103, and the different carrier frequency to which the currently using carrier frequency is changed over is 104. And at the upstream channel, the currently using carrier frequency is 101, and the different carrier frequency to which the currently using carrier frequency is changed over is 102.

At this time, the mobile communication terminal 30 measures the reception quality Q_1 in the broadcast channel of the currently using carrier frequency 103 and the reception quality Q_2 in the broadcast channel of the different carrier frequency 104 to which the currently using carrier frequency is changed over, and compares the measured results. And at the time when the difference between the reception quality Q_1 and Q_2 satisfies the following inequality (2), the changing over to the different frequency is executed.

$$Q\_2 - Q\_1 > Th\_HO \text{ [dB]} \quad (2)$$

The changing over to the different frequency signifies that a carrier frequency using currently is changed over to a different frequency. In this case, at the downstream channel, the carrier frequency is changed over from the carrier frequency 103 to the carrier frequency 104, and at the upstream channel, the carrier frequency is changed over from the carrier frequency 101 to the carrier frequency 102.

At the inequality shown in (2), the Th_HO signifies a judging threshold value at the control for changing over to a different frequency, and the value of the Th_HO is positive.

Generally, at the inequality (2), the smaller the value of the Th_HO is, the smaller the probability generating a call drop becomes. However, the load controlling the changing over to the different frequency is increased when the value of the Th_HO is set to be small. Therefore, an optimum value is set as the value of the Th_HO. By the description mentioned above, the conventional method for changing over to the different frequency corresponding to the reception quality in the broadcast channels was explained.

At the cellular phone system using plural carrier frequencies, generally the mobile communication terminal in the system uses one oscillator from the viewpoint of low power consumption, and the oscillating frequency of the oscillator is changed, when it is needed. Under this structure of the mobile communication terminal, when the reception quality of the different carrier frequency, to which the currently using carrier frequency is changed over, is measured, there is a following problem due to the one oscillator. That is, the mobile communication terminal cannot receive data from the currently using carrier frequency while the mobile communication terminal is measuring the reception quality of the different carrier frequency to which the currently using carrier frequency is changed over.

Therefore, at the system, it is necessary that its transmitting waveform has been formed, at the state that a data vacant time for measuring the reception quality of the different carrier frequency to which the currently using carrier frequency is changed over is kept beforehand.

In case that the communication speed is a constant, in order to make the data vacant time, a data compression technology, by which the data vacant time is made, is required.

Generally, at the data compression technology, the transmission data are compressed in the time by using a method lowering its diffusion rate or a method making its coding rate higher by that a part of coded data is not transmitted. At the data compression technology, when it is compared with a case in which the data compression technology is not used, the error correction ability at the reception is deteriorated, therefore the frequency utilization efficiency is lowered. Consequently, it is not desirable that the ratio of the data vacant time to the communication time becomes high. Hereinafter, the ratio of the data vacant time to the communication time is referred to as the ratio of the data vacant time.

By the reason mentioned above, at the time of measuring the different frequency, it is desirable that the timing of changing over to the different frequency is judged accurately in a low ratio of the data vacant time. In order to lower the ratio of the data vacant time, the following improved control method is used for the conventional method for changing over to the different frequency mentioned above.

Next, this improved method, in which the range of the measurement of the different frequency is limited, is explained. In FIG. 3, at the downstream channel to the mobile communication terminal 30, the waveform of the reception quality Q_1 of the broadcast channel in the currently using carrier frequency and the waveform of the reception quality Q_2 of the broadcast channel in the different carrier frequency to which the currently using carrier frequency is changed over are shown.

In FIG. 3, in order to decrease the data vacant time at the time when the different frequency (the reception quality Q_2) is measured, the mobile communication terminal 30 starts to measure the different frequency (the reception quality Q_2) at the time t1 or t3, when the reception quality Q_1 of the broadcast channel in the currently using carrier frequency satisfied the following inequality (3).

$$Q\_1 < Th\_Start \quad (3)$$

After this, the mobile communication terminal 30 ends the measurement of the different frequency at the time t2, when the reception quality Q_1 of the broadcast channel in the currently using carrier frequency satisfied the following inequality (4). Or the mobile communication terminal 30 ends the measurement of the different frequency at the time t4, when the inequality (2) was satisfied, at the same time the control of the changing over to the different frequency is started.

$$Q\_1 > Th\_End \quad (4)$$

In this case, the judging threshold values Th_Start and Th_End in the inequalities (3) and (4) are desirable to have a margin satisfying the following inequality (5).

$$Th\_End - Th\_Start > 0 \text{ [dB]} \quad (5)$$

In the inequality (5), the larger the difference between the Th_End and Th_Start is, the larger the margin becomes. By the concept mentioned above, the range of measuring the different frequency is limited by using the judging threshold values Th_Start and Th_End. With this, the ratio of the data vacant time can be decreased, compared with the case in which the range of measuring the different frequency is not limited.

Generally, when the margin becomes large, the number of times of start and end of the measurement of the different frequency is decreased, and there is an advantage that the controlling load at the base station controlling apparatus 60 is decreased. However, since the number of times of the end of the measurement of the different frequency is decreased, the ratio of the data vacant time is increased, and the channel capacity is decreased. Therefore, the margin at the inequality (5) must be an optimum value.

Next, a cellular phone system showing in FIG. 4 is studied. In FIG. 4, the mobile communication terminal 30 can connect its channel to any of the base stations 10, 11, and 20. The carrier frequencies, which the mobile communication terminal 30 uses in the channel with the base stations 10 and 11, is a carrier frequency 101 at the upstream channel, and a carrier frequency 103 at the downstream channel shown in FIG. 2. And the carrier frequencies, which the mobile communication terminal 30 uses in the channel with the base station 20, is a carrier frequency 102 at the upstream channel and a carrier frequency 104 at the downstream channel shown in FIG. 2.

And the judgement changing over to the different frequency, whether the mobile communication terminal 30 connects to the base stations 10 and 11 or the base station 20 during its communication, is controlled by the base station controlling apparatus 60 or the mobile communication terminal 30. And also the base station controlling apparatus 60 or the mobile communication terminal 30 executes the control changing over to the different frequency.

In FIG. 4, the base station 10 belongs to a macro-cell 85 and the base station 20 belongs to a macro-cell 87, and the base station 11 belongs to a micro-cell 86. At the cellular phone system shown in FIG. 4, in which a micro-cell is added in a macro-cell, by disposing the micro-cell in an area, where many mobile communication terminals exist, in the macro-cell, an effect dispersing the traffic can be obtained. Therefore, this is one of the methods for designing effective cells.

At the conventional technology, as mentioned above, in the inequality (2), the relative value $(Q\_2-Q\_1)$ between the reception quality $Q\_1$ of the broadcast channel in the currently using carrier frequency and the reception quality $Q\_2$ of the broadcast channel in the different frequency to which the currently using carrier frequency is changed over is compared with the judging threshold value Th_HO. In this case, the judging threshold value Th_HO in the inequality (2) is a constant value being not relating to the moving velocity of the mobile communication terminal. Therefore, there is the following problem at the cellular phone system shown in FIG. 4.

At the conventional technology, when the moving velocity of a mobile communication terminal connecting to a micro-cell becomes high, the probability that the mobile communication terminal moves out of the area of the micro-cell becomes high. Consequently, the probability deteriorating the reception quality of the channel becomes high, and the probability generating a call drop becomes high. Further, in case that a micro-cell cellular is composed of plural micro-cells and a macro-cell exists in a state that the micro-cell cellular is covered with the macro-cell, when the moving velocity of a mobile communication terminal connecting to a micro-cell becomes high, the number of times of changing over to different micro-cells by the mobile communication terminal becomes large. Consequently, the load changing over to the different micro cells becomes large.

Therefore, at the conventional technology, there is a problem that it is difficult to decrease the probability generating the call drop and to decrease the load changing over to the different micro-cells when the moving velocity of a mobile communication terminal connecting a micro cell becomes high.

Further, at the method for changing over to a different frequency in the conventional technology, a case, in which the moving velocity of a mobile communication terminal whose channel is connecting to a macro-cell becomes low and the mobile communication terminal stays in the area of a micro-cell, is assumed. In this case, the transmission power from the mobile communication terminal whose channel is connecting to the macro-cell to a base station in the macro-cell and the transmission power from the base station in the macro-cell to the mobile communication terminal exist. And the transmission power mentioned above is compared with the transmission power in a case that the mobile communication terminal changes over its channel to a micro cell. In this case, there is the probability that the transmission power in the macro-cell becomes higher than that in the micro-cell. When the transmission power becomes large, the power consumption also becomes large. Further, when the transmission power becomes large, the interference power to other cells is increased, and the call drop ratio becomes large.

SUMMARY OF THE INVENTION

It is therefore an object of the present invention to provide a method for changing over to a different frequency at a cellular phone system, and a cellular phone system using the method, and a base station controlling apparatus in the system, and a mobile communication terminal in the system. In particular, at the system, when the moving velocity of the mobile communication terminal connecting a macro-cell becomes low, lowering the probability generating a call drop and decreasing the power consumption can be realized. Further, at the system, when the moving velocity of the mobile communication terminal connecting a micro-cell becomes high, lowering the probability generating a call drop and decreasing the power consumption can be realized.

According to a first aspect of the present invention, for achieving the object mentioned above, there is provided a method for changing over to a different frequency at a cellular phone system, in which a mobile communication terminal, a first base station and a second base station, and a base station controlling apparatus are provided. And the first base station communicates with the mobile communication terminal by setting a channel using a first frequency, and the second base station communicates with the mobile communication terminal by setting a channel using a second frequency. And the mobile communication terminal measures first reception quality in the first frequency and second reception quality in the second frequency during the communication with the first base station by setting a channel. And the mobile communication terminal is controlled to communicate with the second base station by changing over the channel from the first base station to the second base station, when the difference between the second reception quality and the first reception quality exceeds a first threshold value. And the method for changing over to a different frequency provides the step of controlling to change the first threshold value corresponding to the moving velocity of the mobile communication terminal.

According to a second aspect of the present invention, there is provided a method for changing over to a different frequency at a cellular phone system, in which a mobile communication terminal, a first base station and a second base station, and a base station controlling apparatus are provided. And the first base station communicates with the mobile communication terminal by setting a channel using a first frequency, and the second base station communicates with the mobile communication terminal by setting a channel using a second frequency. And the mobile communication terminal measures first reception quality in the first frequency during the communication with the first base station by setting a channel, and also the mobile communication terminal measures second reception quality in the second frequency corresponding to the measured first reception quality during the communication with the first base station by setting a channel. And the mobile communication terminal is controlled to communicate with the second base station by changing over the channel from the first base station to the second base station corresponding to the first and second reception quality. And the method for changing over to a different frequency provides the step of controlling to change the condition measuring the second reception quality corresponding to the moving velocity of the mobile communication terminal.

According to a third aspect of the present invention, in the second aspect, the method for changing over to a different frequency further provides the steps of, changing a second threshold value and a third threshold value corresponding to the moving velocity of the mobile communication terminal, when the condition measuring the second reception quality is controlled to change, and measuring the second reception quality when the first reception quality is less than the changed second threshold value.

According to a fourth aspect of the present invention, in the first or second aspect, the first base station transmits a first broadcast channel and the second base station transmits a second broadcast channel, and the first reception quality is reception quality in the first broadcast channel and the second reception quality is reception quality in the second broadcast channel.

According to a fifth aspect of the present invention, in the first or second aspect, the method for changing over to a different frequency further provides the steps of, making a data vacant time in which data are not transmitted by compressing transmitting data in the time by the first base station, and measuring the second reception quality in the data vacant time by the mobile communication terminal.

According to a sixth aspect of the present invention, in the first aspect, the controlling to change the first threshold value corresponding to the moving velocity of the mobile communication terminal is executed at the base station controlling apparatus or the mobile communication terminal.

According to a seventh aspect of the present invention, in the second aspect, the controlling to change the condition measuring the second reception quality corresponding to the moving velocity of the mobile communication terminal is executed at the base station controlling apparatus or the mobile communication terminal.

According to an eighth aspect of the present invention, for achieving the object mentioned above, there is provided a cellular phone system, in which a mobile communication terminal, a first base station and a second base station, and a base station controlling apparatus are provided. And the first base station communicates with the mobile communication terminal by setting a channel using a first frequency, and the second base station communicates with the mobile communication terminal by setting a channel using a second frequency. And the mobile communication terminal measures first reception quality in the first frequency and second reception quality in the second frequency during the communication with the first base station by setting a channel. And the mobile communication terminal is controlled to communicate with the second base station by changing over the channel from the first base station to the second base station, when the difference between the second reception quality and the first reception quality exceeds a first threshold value. And the cellular phone system provides a first controlling means for controlling to change the first threshold value corresponding to the moving velocity of the mobile communication terminal.

According to a ninth aspect of the present invention, there is provided a cellular phone system, in which a mobile communication terminal, a first base station and a second base station, and a base station controlling apparatus are provided. And the first base station communicates with the mobile communication terminal by setting a channel using a first frequency, and the second base station communicates with the mobile communication terminal by setting a channel using a second frequency. And the mobile communication terminal measures first reception quality in the first frequency during the communication with the first base station by setting a channel, and also the mobile communication terminal measures second reception quality in the second frequency corresponding to the measured first reception quality during the communication with the first base station by setting a channel. And the mobile communication terminal is controlled to communicate with the second base station by changing over the channel from the first base station to the second base station corresponding to the first and second reception quality. And the cellular phone system provides a second controlling means for controlling to change the condition measuring the second reception quality corresponding to the moving velocity of the mobile communication terminal.

According to tenth aspect of the present invention, in the ninth aspect, the second controlling means provides a changing means for changing a second threshold value and a third threshold value corresponding to the moving velocity of the mobile communication terminal, and a measuring means for measuring the second reception quality when the first reception quality is less than the changed second threshold value.

According to an eleventh aspect of the present invention, in the eighth aspect or the ninth aspect, the first base station transmits a first broadcast channel and the second base station transmits a second broadcast channel, and the first reception quality is reception quality in the first broadcast channel and the second reception quality is reception quality in the second broadcast channel.

According to a twelfth aspect of the present invention, in the eighth aspect or the ninth aspect, the first base station provides a data vacant time making means for making a data vacant time in which data are not transmitted by compressing transmitting data in the time, and the mobile communication terminal provides a measuring means for measuring the second reception quality in the data vacant time.

According to a thirteenth aspect of the present invention, in the eighth aspect, the first controlling means is provided in the base station controlling apparatus or the mobile communication terminal.

According to a fourteenth aspect of the present invention, in the ninth aspect, the second controlling means is provided in the base station controlling apparatus or the mobile communication terminal.

According to a fifteenth aspect of the present invention for achieving the object mentioned above, there is provided a base station controlling apparatus in a cellular phone system, in which a mobile communication terminal, a first base station and a second base station, and the base station controlling apparatus are provided. And the first base station communicates with the mobile communication terminal by setting a channel using a first frequency, and the second base station communicates with the mobile communication terminal by setting a channel using a second frequency. And the mobile communication terminal measures first reception quality in the first frequency and second reception quality in the second frequency during the communication with the first base station by setting a channel. And the mobile communication terminal is controlled to communicate with the second base station by changing over the channel from the first base station to the second base station, when the difference between the second reception quality and the first reception quality exceeds a first threshold value. And the base station controlling apparatus provides a first controlling means for controlling to change the first threshold value corresponding to the moving velocity of the mobile communication terminal.

According to a sixteenth aspect of the present invention, there is provided a base station controlling apparatus in a cellular phone system, in which a mobile communication terminal, a first base station and a second base station, and the base station controlling apparatus are provided. And the first base station communicates with the mobile communication terminal by setting a channel using a first frequency, and the second base station communicates with the mobile communication terminal by setting a channel using a second frequency. And the mobile communication terminal measures first reception quality in the first frequency during the communication with the first base station by setting a channel, and also the mobile communication terminal measures second reception quality in the second frequency corresponding to the measured first reception quality during the communication with the first base station by setting a channel. And the mobile communication terminal is controlled to communicate with the second base station by changing over the channel from the first base station to the second base station corresponding to the first and second reception quality. And the base station controlling apparatus provides a second controlling means for controlling to change the condition measuring the second reception quality corresponding to the moving velocity of the mobile communication terminal.

According to a seventeenth aspect of the present invention, in the sixteenth aspect, the second controlling means provides a changing means for changing a second threshold value and a third threshold value corresponding to the moving velocity of the mobile communication terminal, and a measuring means for measuring the second reception quality when the first reception quality is less than the changed second threshold value.

According to an eighteenth aspect of the present invention, there is provided a mobile communication terminal in a cellular phone system, in which the mobile communication terminal, a first base station and a second base station, and a base station controlling apparatus are provided. And the first base station communicates with the mobile communication terminal by setting a channel using a first frequency, and the second base station communicates with the mobile communication terminal by setting a channel using a second frequency. And the mobile communication terminal measures first reception quality in the first frequency and second reception quality in the second frequency during the communication with the first base station by setting a channel, and the mobile communication terminal is controlled to communicate with the second base station by changing over the channel from the first base station to the second base station, when the difference between the second reception quality and the first reception quality exceeds a first threshold value. And the mobile communication terminal provides a first controlling means for controlling to change the first threshold value corresponding to the moving velocity of the mobile communication terminal.

According to a nineteenth aspect of the present invention, there is provided a mobile communication terminal in a cellular phone system, in which the mobile communication terminal, a first base station and a second base station, and a base station controlling apparatus are provided. And the first base station communicates with the mobile communication terminal by setting a channel using a first frequency, and the second base station communicates with the mobile communication terminal by setting a channel using a second frequency. And the mobile communication terminal measures first reception quality in the first frequency during the communication with the first base station by setting a channel, and also the mobile communication terminal measures second reception quality in the second frequency corresponding to the measured first reception quality during the communication with the first base station by setting a channel. And the mobile communication terminal is controlled to communicate with the second base station by changing over the channel from the first base station to the second base station corresponding to the first and second reception quality. And the mobile communication terminal provides a second controlling means for controlling to change the condition measuring the second reception quality corresponding to the moving velocity of the mobile communication terminal.

According to a twentieth aspect of the present invention, in the nineteenth aspect, the second controlling means provides a changing means for changing a second threshold value and a third threshold value corresponding to the moving velocity of the mobile communication terminal, and a measuring means for measuring the second reception quality when the first reception quality is less than the changed second threshold value.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
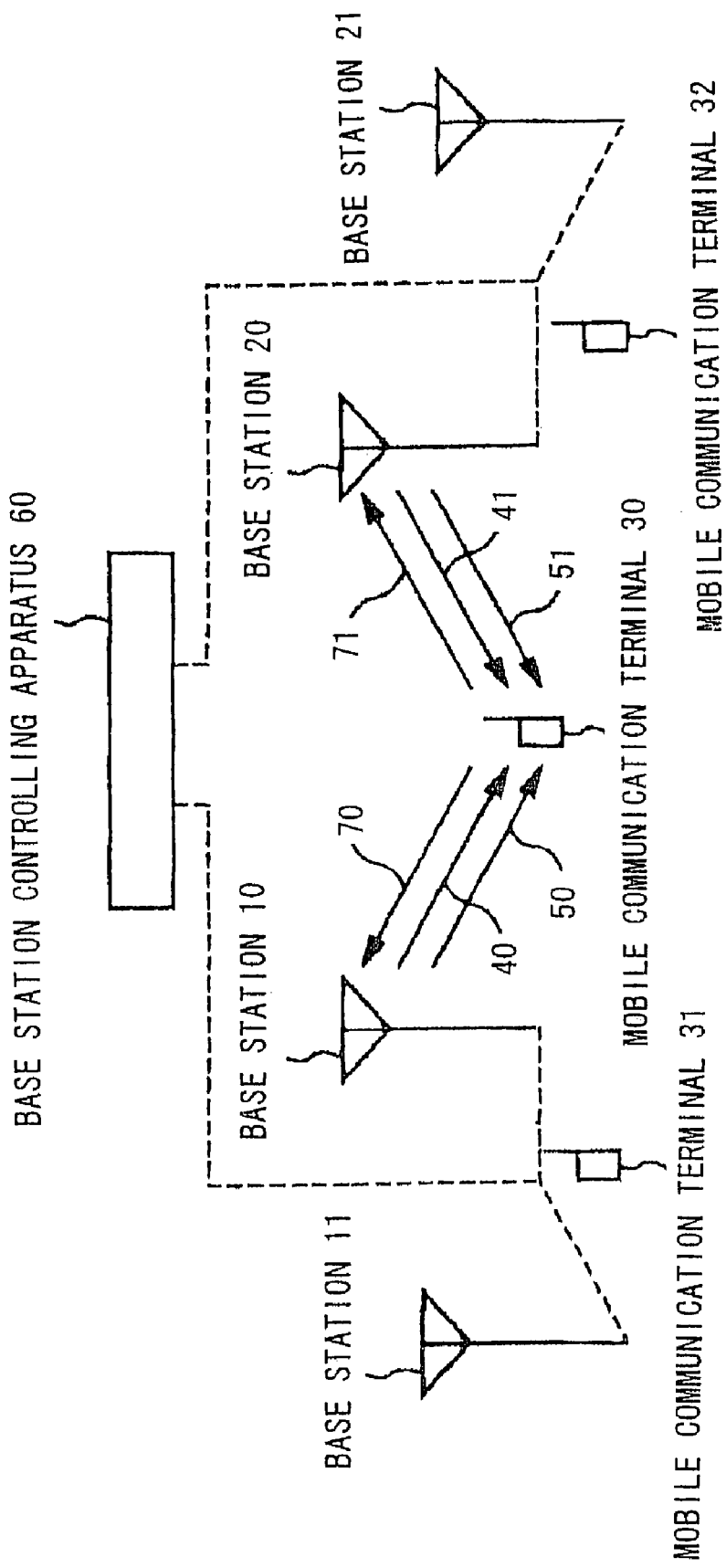
FIG. 1 is a block diagram showing the structure of a cellular phone system using a CDMA system at the embodiments of the present invention.

Referring now to the drawings, embodiments of the present invention are explained in detail. In the explanation of the embodiments of the present invention, the drawings used at the explanation of the conventional technology are also used. That is, FIGS. 1 to 4 are used at the explanation of the embodiments of the present invention. Further, in the explanation of the embodiments of the present invention, the communication between a mobile communication terminal and a base station controlling apparatus is executed via a base station. Therefore, for example, in case that an expression, which a mobile communication terminal transmits information to a base station controlling apparatus, exists, this signifies that the information is actually transmitted from the mobile communication terminal to the base station controlling apparatus via the base station.

Figure 2:
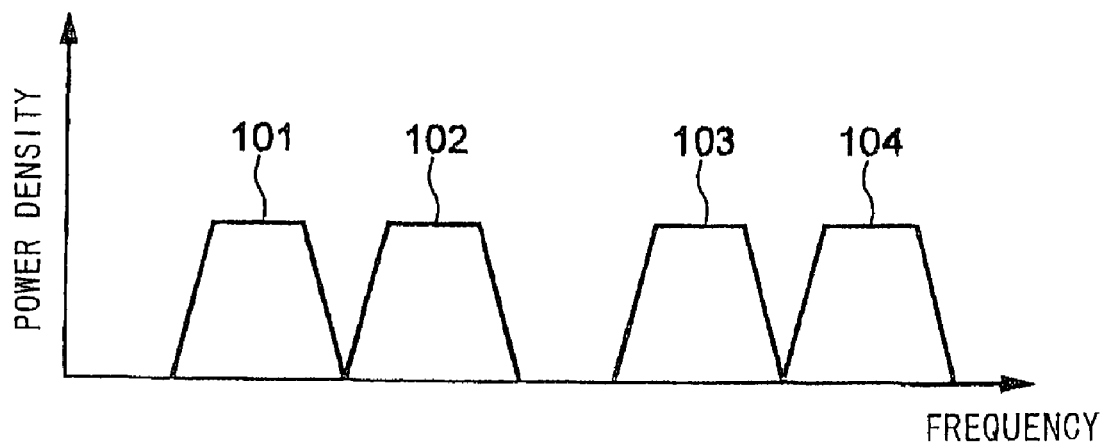
FIG. 2 is a graph showing the positions of carrier frequencies in an upstream channel and a downstream channel at the embodiments of the present invention.
Figure 3:
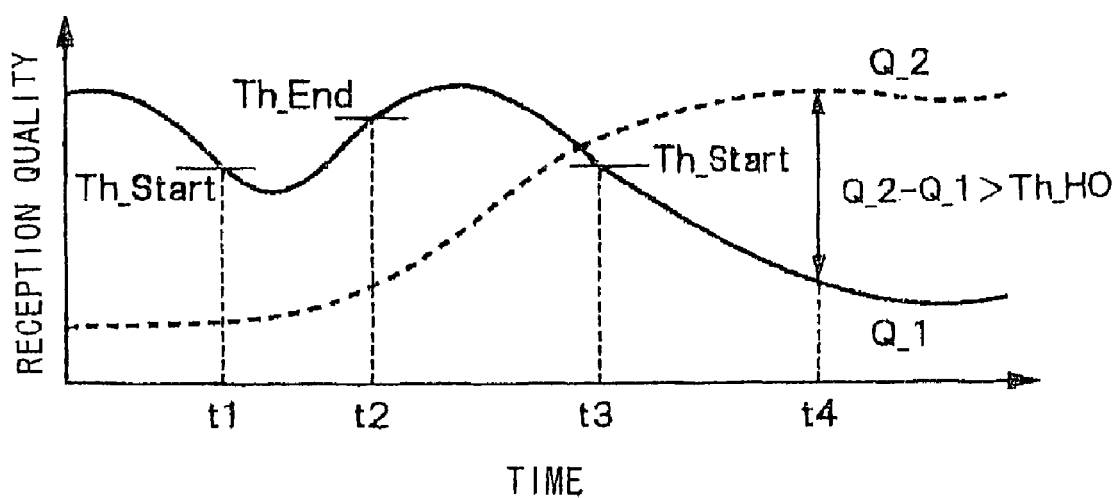
FIG. 3 is a graph showing waveforms of the reception quality $Q\_1$ in a currently using carrier frequency and the reception quality $Q\_2$ in a different carrier frequency to which the currently using carrier frequency is changed over in the passage of time at the embodiments of the present invention.
Figure 4:
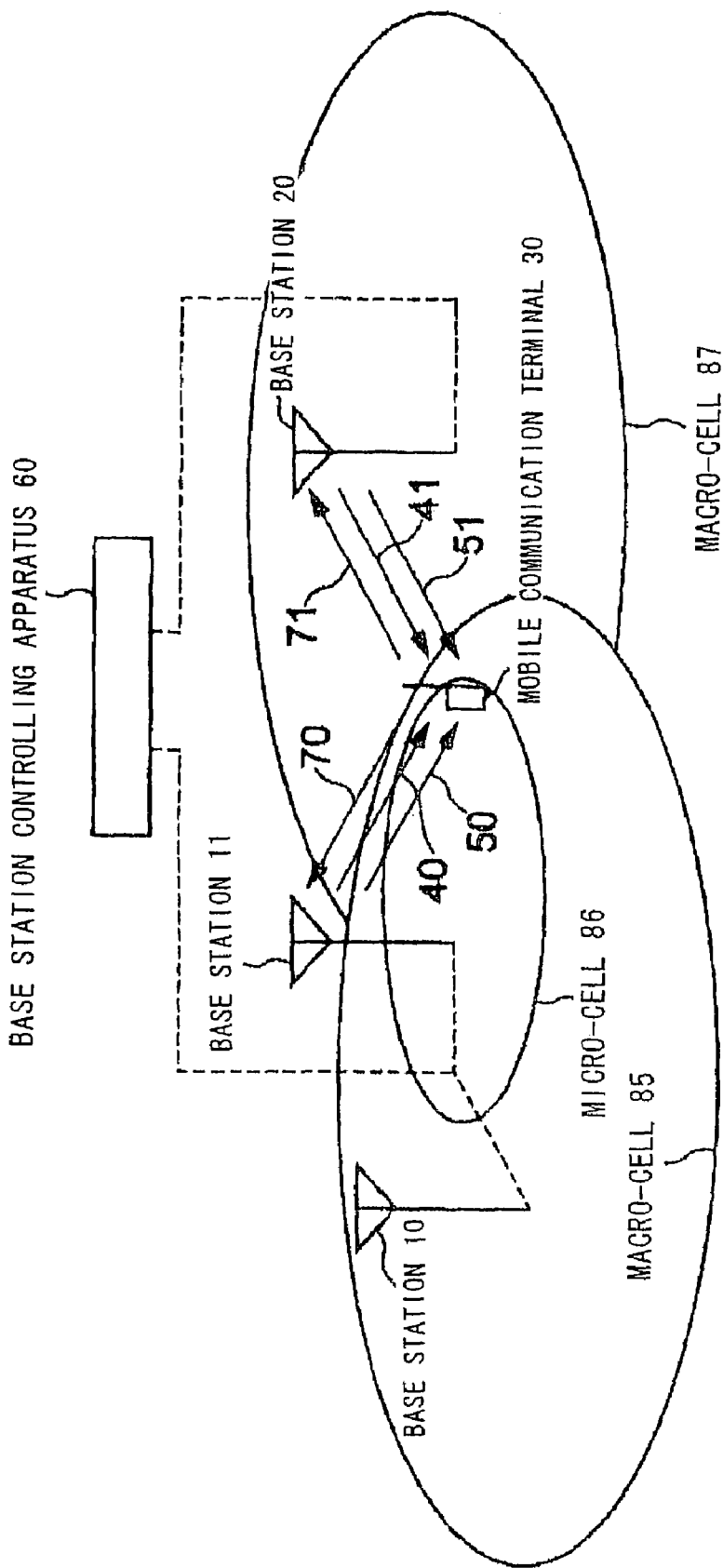
FIG. 4 is a block diagram showing the structure of a cellular phone system using a CDMA system in which macro-cells and a micro-cell are shown at the embodiments of the present invention.

FIG. 1 is a block diagram showing the structure of a cellular phone system using a CDMA system at the embodiments of the present invention. FIG. 2 is a graph showing the positions of carrier frequencies in an upstream channel and a downstream channel at the embodiments of the present invention. FIG. 3 is a graph showing waveforms of the reception quality Q_1 in a currently using carrier frequency and the reception quality Q_2 in a different carrier frequency to which the currently using carrier frequency is changed over in the passage of time at the embodiments of the present invention. FIG. 4 is a block diagram showing the structure of a cellular phone system using a CDMA system in which macro-cells and a micro-cell are shown at the embodiments of the present invention.

In FIG. 4, a case, in which the cellular phone system uses two carrier frequencies in one service area, is shown.

In FIG. 4, a mobile communication terminal 30 can connect its channel to any of base stations 10, 11, and 20. Further, in FIG. 4, a base station controlling apparatus 60 is shown. In FIG. 4, the number of the mobile communication terminals is one, however, this number is not limited to one and actually plural mobile communication terminals exist in the system, and the number of the base stations is three, however, this number in not limited to three and actually plural base stations exist in the system.

In FIG. 2, the carrier frequencies, which the mobile communication terminal 30 uses in the channel with the base stations 10 and 11, are a carrier frequency 101 at the upstream channel and a carrier frequency 103 at the downstream channel. And the carrier frequencies, which the mobile communication terminal 30 uses in the channel with the base station 20 is a carrier frequency 102 at the upstream channel and a carrier frequency 104 at the downstream channel.

The base station controlling apparatus 60 or the mobile communication terminal 30 judges whether the mobile communication terminal 30 connects to the base station 10 or 11, or the base station 20 during the communication of the mobile communication terminal 30. And also the base station controlling apparatus 60 or the mobile communication terminal 30 controls the changing over to the different frequency.

In FIG. 4, the base station 10 belongs to a macro-cell 85, and the base station 20 belongs to a macro-cell 87, and the base station 11 belongs to a micro-cell 86. In this, a micro-cell cellular can be composed of plural micro-cells. And the control of the transmission power has been applied to the upstream channel and the downstream channel.

The measurement of the different frequency at the mobile communication terminal 30 is executed by utilizing the data vacant time. The data vacant time is made by the data compression technology. At the data compression technology, the transmission data at the downstream channel are compressed in the time by using a method lowering its diffusion rate or a method making its coding rate higher by that a part of coded data is not transmitted, with this, the data vacant time is made.

Figure 5:
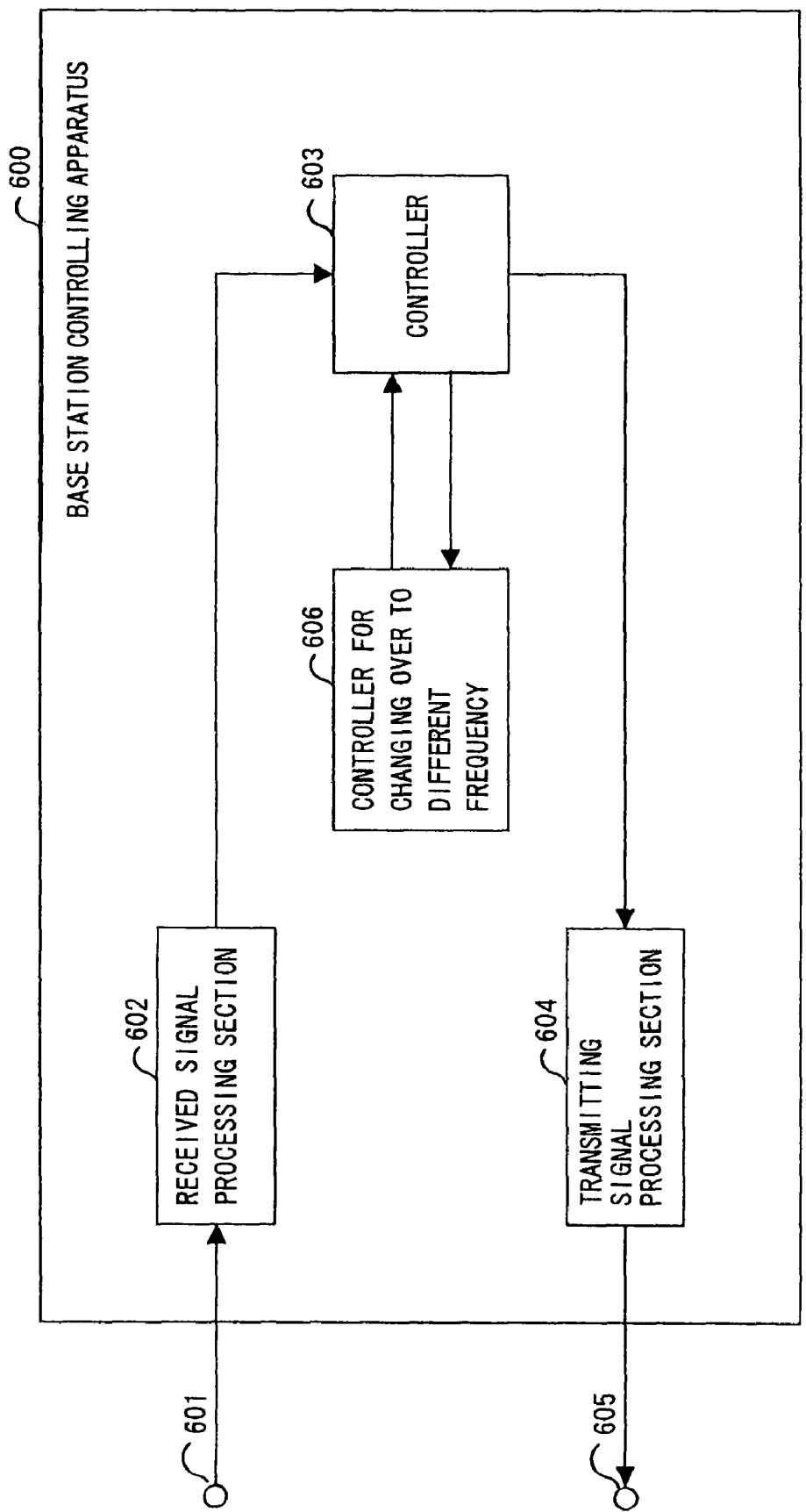
FIG. 5 is a block diagram showing the structure of a base station controlling apparatus at a first embodiment of the present invention.

FIG. 5 is a block diagram showing the structure of a base station controlling apparatus at a first embodiment of the present invention. Referring to FIG. 5, the base station controlling apparatus at the first embodiment of the present invention is explained.

As shown in FIG. 5, a base station controlling apparatus 600 provides an input terminal 601, a received signal processing section 602, a controller 603, a transmitting signal processing section 604, an output terminal 605, and a controller for changing over to different frequency 606. In FIG. 5, the new reference number 600 is attached to the base station controlling apparatus, instead of the reference number 60 in FIGS. 1 and 4, however the functions of the base station controlling apparatus are the same in FIGS. 1, 4, and 5.

At the input terminal 601, signals from one or plural base stations are received. The received signal processing section 602 processes the signals received at the input terminal 601. The controller 603 executes control based on signals from the base stations and the mobile communication terminals, in this, as mentioned before, the signals from the mobile communication terminals are received via the base stations. The transmitting signal processing section 604 processes transmitting signals. From the output terminal 605, the signals processed at the transmitting signal processing section 604 are transmitted to one or plural base stations. The controller for changing over to different frequency 606 judges whether the measurement of the different frequency is executed or not and controls the changing over to the different frequency.

The controller 603 is explained in more detail. The controller 603 executes control of channel setting between a base station and a mobile communication terminal, and also receives the information of the moving velocity of the mobile communication terminal transmitting form the base station or the mobile communication terminal.

The controller for changing over to different frequency 606 is explained in more detail. The controller for changing over to different frequency 606 receives a request of changing over to the different frequency from the mobile communication terminal, and instructs the base station connecting to the mobile communication terminal to make the data vacant time of the individual channel. Further, the controller for changing over to different frequency 606 sends a control signal for changing over to the different frequency to the base station connecting the mobile communication terminal.

Moreover, the controller for changing over to the different frequency 606 receives the information of the reception quality in the carrier frequencies at the mobile communication terminal from the controller 603, and judges whether the changing over to the different frequency is executed or not based on the received information. Further, the controller for changing over to the different frequency 606 receives the information of the transmission power of the base station, and judges whether the changing over to the different frequency is executed or not. And also the controller for changing over to the different frequency 606 receives the information of the moving velocity of the mobile communication terminal from the controller 603, and judges whether the changing over to the different frequency is executed or not.

Figure 6:
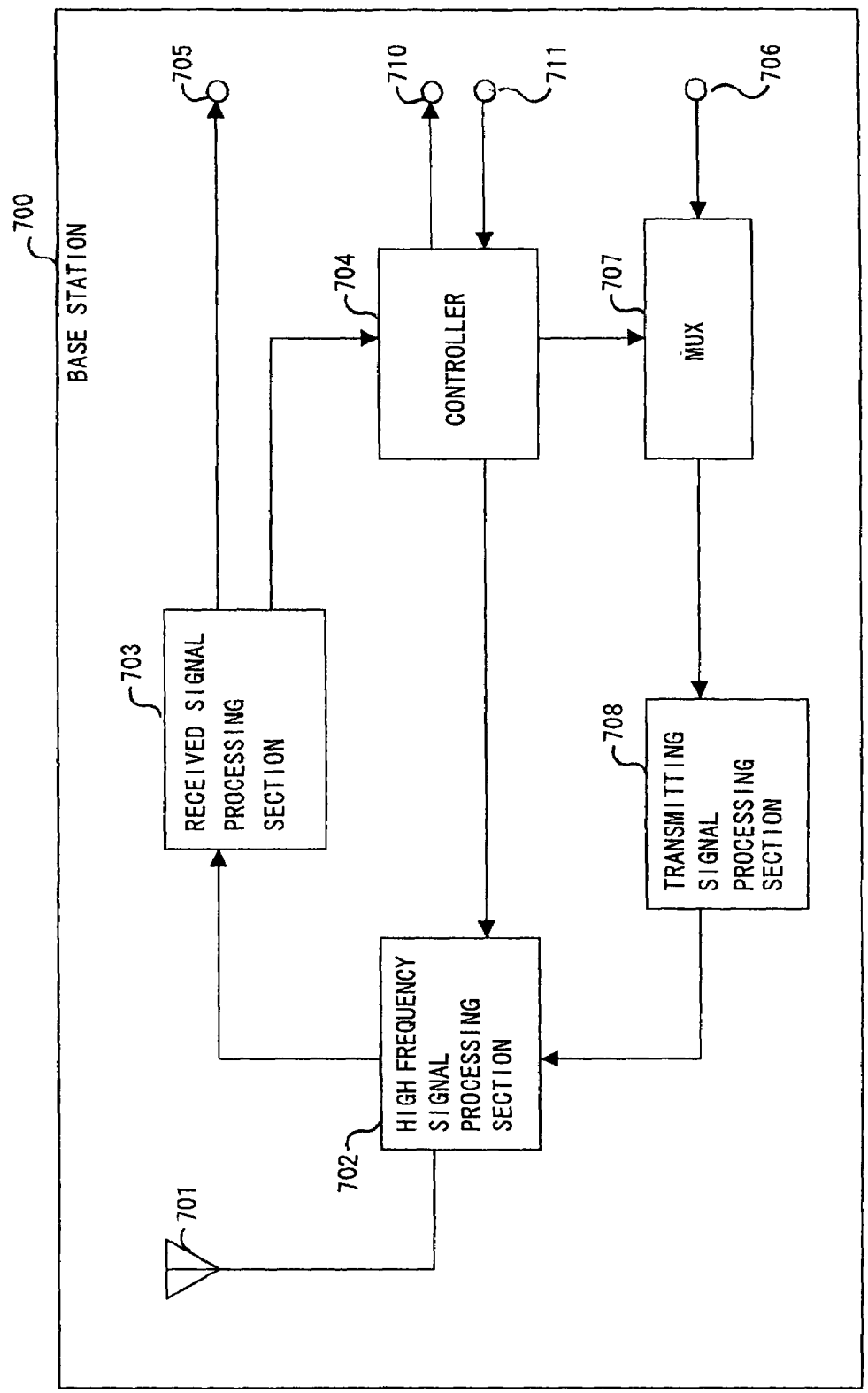
FIG. 6 is a block diagram showing the structure of a base station at the first embodiment of the present invention.

FIG. 6 is a block diagram showing the structure of a base station at the first embodiment of the present invention. Referring to FIG. 6, the base station at the first embodiment of the present invention is explained.

As shown in FIG. 6, a base station 700 provides an antenna 701, a high frequency signal processing section 702, a received signal processing section 703, a controller 704, a first output terminal 705, a first input terminal 706, an MUX (multiplexer) 707, a transmitting signal processing section 708, a second output terminal 710, and a second input terminal 711. In FIG. 6, the new reference number 700 is attached to the base station, instead of the reference number 10, 11, 20, or 21 in FIGS. 1, and 10, 11, or 20 in FIG. 4, however, the functions of the base station are the same in FIGS. 1, 4 and 6.

At the antenna 701, signals from one or plural mobile communication terminals are received, and also from the antenna 701, signals are transmitted to the one or plural mobile communication terminals. The high frequency signal processing section 702 processes received high frequency signals and transmitting high frequency signals. The received signal processing section 703 processes received signals. From the first output terminal 705, received signals processed at the received signal processing section 703 are outputted. From the first input terminal 706, transmitting data are inputted. The controller 704 executes control by using information inputted from the second input terminal 711 that receives control signals transmitted from the base station controlling apparatus 600 shown in FIG. 5. And also the controller 704 transmits control information to the base station controlling apparatus 600 via the second output terminal 710. The MUX 707 multiplexes the transmitting data inputted from the first input terminal 706 and control signals from the controller 704. The transmitting signal processing section 708 processes the data multiplexed at the MUX 707.

The high frequency signal processing section 702 is explained in more detail. The high frequency signal processing section 702 changes over the frequency using at transmission or reception by receiving a control signal changing over to the different frequency from the controller 704.

The controller 704 is explained in more detail. The controller 704 measures the reception quality of the received signal inputted from the received signal processing section 703, and controls the transmission power to the mobile communication terminal. And also the controller 704 controls the transmission and the reception of its own base station 700 based on a control signal received from the base station controlling apparatus 600. Further, the controller 704 receives a control signal for changing over to the different frequency from the base station controlling apparatus 600, and inputs the control signal changing over to the different frequency using at the transmission or the reception to the high frequency signal processing section 702.

Moreover, the controller 704 receives the control signal for changing over to the different frequency from the base station controlling apparatus 600, and inputs a control signal for making the data vacant time of the individual channel to the high frequency processing section 702.

Figure 7:
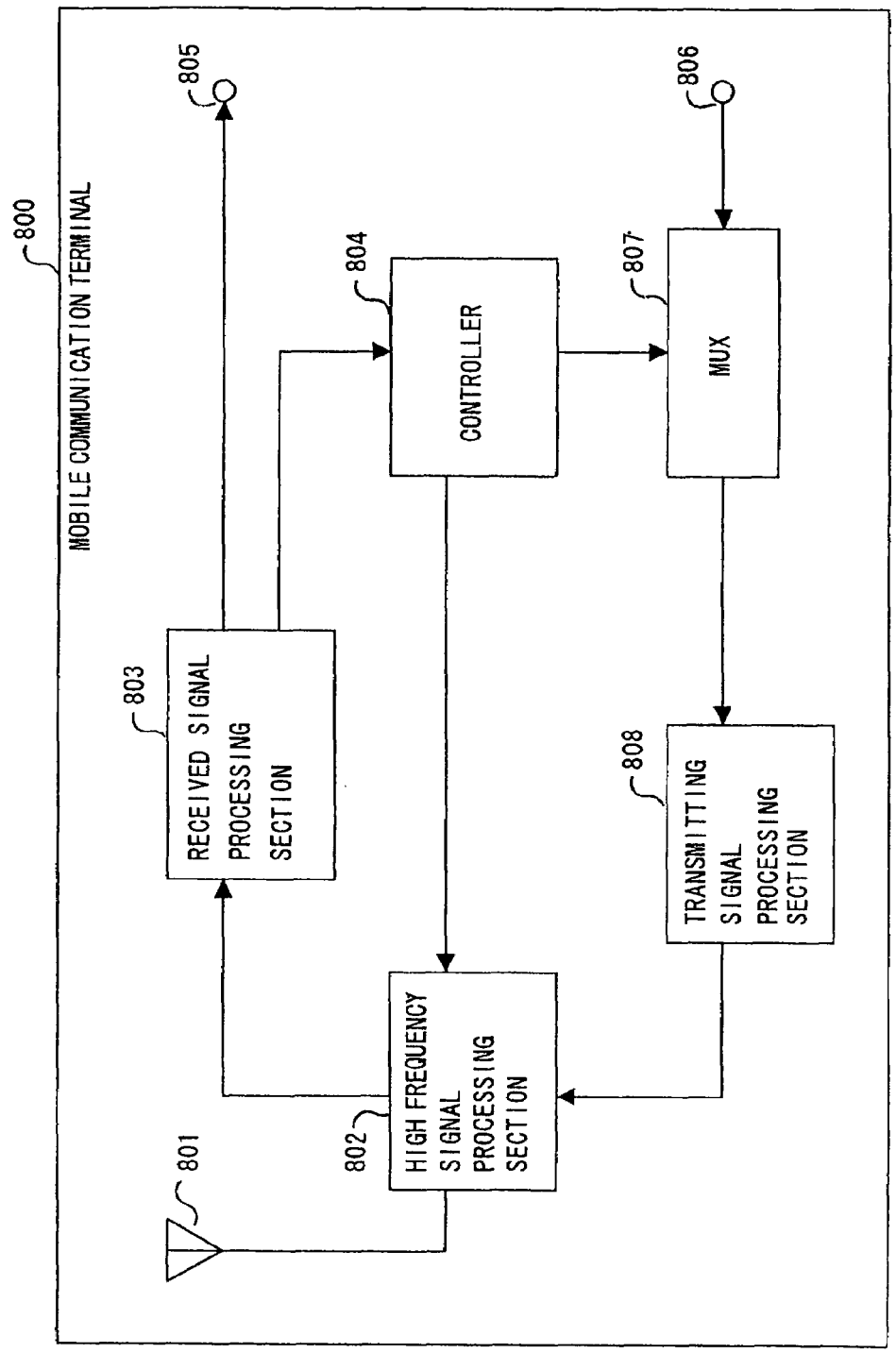
FIG. 7 is a block diagram showing the structure of a mobile communication terminal at the first embodiment of the present invention.

FIG. 7 is a block diagram showing the structure of a mobile communication terminal at the first embodiment of the present invention. Referring to FIG. 7, the mobile communication terminal at the first embodiment of the present invention is explained.

As shown in FIG. 7, a mobile communication terminal 800 provides an antenna 801, a high frequency signal processing section 802, a received signal processing section 803, a controller 804, an output terminal 805, an input terminal 806, an MUX 807, and a transmitting signal processing section 808. In FIG. 7, the new reference number 800 is attached to the mobile communication terminal, instead of the reference number 30, 31, or 32 in FIG. 1, and 30 in FIG. 4, however, the functions of the mobile communication terminal are the same in FIGS. 1, 4, and 7.

At the antenna 801, signals from one or plural base stations are received, and also from the antenna 801, signals are transmitted to the one or plural base stations. The high frequency signal processing section 802 processes received high frequency signals and transmitting high frequency signals. The received signal processing section 803 processes received signals. From the output terminal 805, received signals processed at the received signal processing section 803 are outputted. From the input terminal 806, transmitting data are inputted. The controller 804 executes control by using control signals from the received signal processing section 803. The MUX 807 multiplexes the transmitting data inputted from the input terminal 806 and control signals from the controller 804. The transmitting signal processing section 808 processes the data multiplexed at the MUX 807.

The controller 804 is explained in more detail. The controller 804 cyclically measures the broadcast channel transmitted from the base station 700, which were inputted from the received signal processing section 803, and processes information of the measured result for transmitting the information to the base station controlling apparatus 600 shown in FIG. 5. And the controller 804 measures the reception quality of the signals received at the received signal processing section 803, and generates control signals of the transmission power of one or plural base stations. And the controller 804 controls the transmission power based on the information received from the one or plural base stations. Further, the controller 804 has a function to detect the moving velocity of its own mobile communication terminal 800, and informs the base station controlling apparatus 600 about the detected velocity information.

Figure 8:
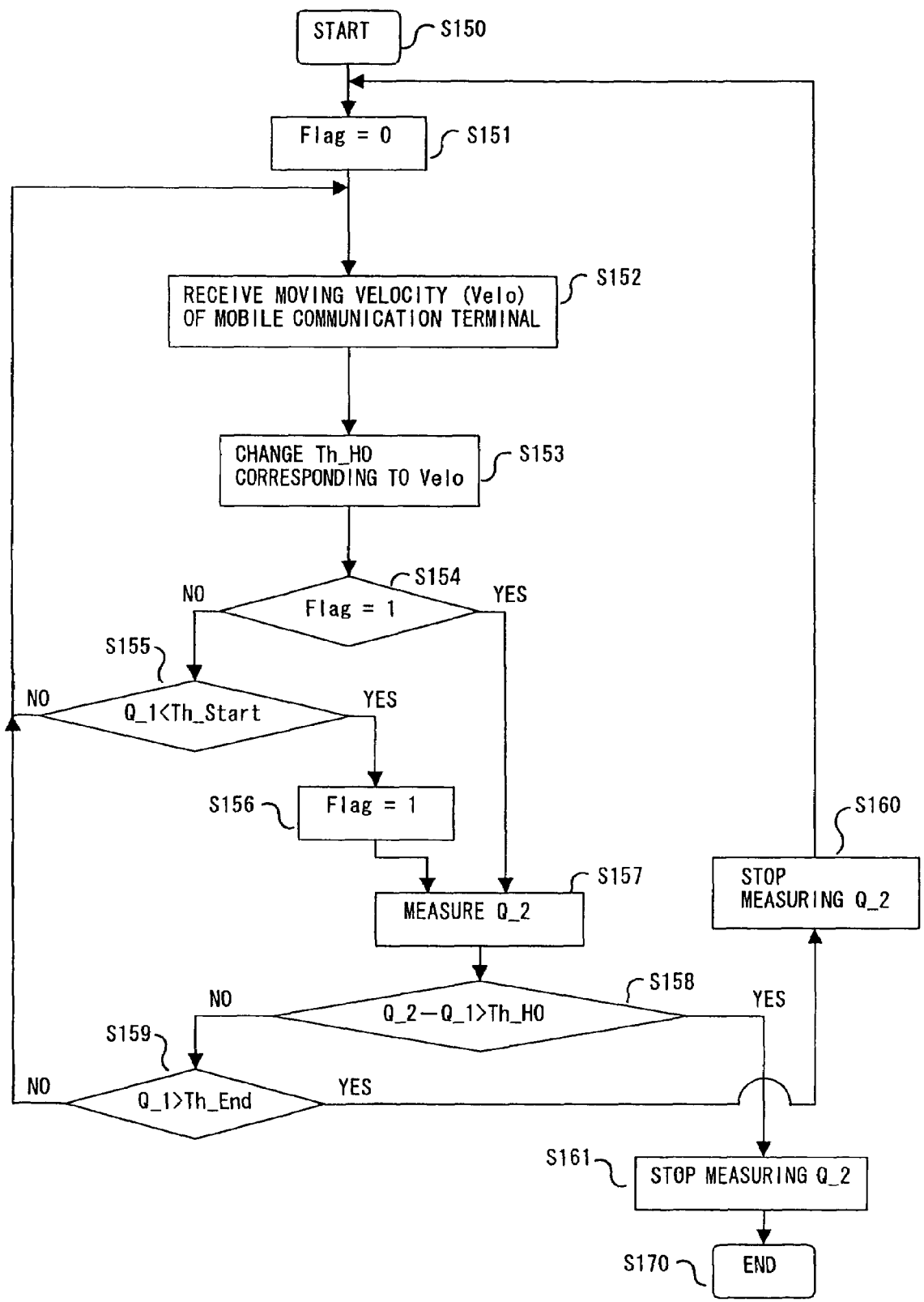
FIG. 8 is a flowchart showing the operation at a controller for changing over to different frequency at the first embodiment of the present invention.

Next, the operation at a method for changing over to a different frequency at the first embodiment of the present invention is explained. The operation at the method for changing over to the different frequency at the first embodiment of the present invention is mainly executed at the controller for changing over to different frequency 606 in the base station controlling apparatus 600 shown in FIG. 5. FIG. 8 is a flowchart showing the operation at the controller for changing over to different frequency 606 at the first embodiment of the present invention.

Referring to FIG. 8, the operation at the controller for changing over to different frequency 606 at the first embodiment of the present invention is explained.

First, the control of changing over to a different frequency at the controller for changing over to different frequency 606 is started (step S150). That is, the step S150 shows the starting time of the control of changing over to a different frequency. Next, Flag=0, which signifies that the measurement of the different frequency is in the OFF mode, is set as the initial state (step S151). In this, Flag=1 signifies that the measurement of the different frequency is in the ON mode. That is, the Flag=1 signifies the starting mode of the measurement of the different frequency, and the Flag=0 signifies the stopping mode of the measurement of the different frequency.

And the detected result of the moving velocity (Velo) of the mobile communication terminal is received (step S152). And the judging threshold value Th_HO in the inequality (2) is changed corresponding to the Velo (step S153). In this, the inequality (2): Q_2−Q_1>Th_HO.

At the step S152, the moving velocity (Velo) of the mobile communication terminal is actually detected by the number of times of soft hand-over or the number of times of the change of the reception quality. For example, in case that the number of times of the soft hand-over at the mobile communication terminal is large, or the number of times of the change of the reception quality at the mobile communication terminal is large, it can be judged that the mobile communication terminal is moving in the high velocity. On the other hand, in case that the number of times of the soft hand-over at the mobile communication terminal is small, or the number of times of the change of the reception quality at the mobile communication terminal is small, it can be judged that the mobile communication terminal is moving in the low velocity.

At the step S153, the judging threshold value Th_HO is actually changed by selecting one of the following two cases.

First, a first case in which the mobile communication terminal has been connected to a macro-cell is explained. In this case, when the moving velocity (Velo) of the mobile communication terminal at the step S152 is high, the judging threshold value Th_HO is changed to be a large value, and when the moving velocity (Velo) of the mobile communication terminal is low, the judging threshold value Th_HO is changed to be a small value.

Second, a second case in which the mobile communication terminal has been connected to a micro-cell is explained. In this case, when the moving velocity (Velo) of the mobile communication terminal at the step S152 is high, the judging threshold value Th_HO is changed to be a small value, and when the moving velocity (Velo) of the mobile communication terminal is low, the judging threshold value Th_HO is changed to be a large value.

Next, the flag value (Flag) signifying the ON or OFF mode of the measurement of the different frequency is judged (step S154). That is, that Flag=1 or not is judged at the step S154. When that the Flag=0 was judged at the step S154 (NO at the step S154), that is, it was judged that the measurement of the different frequency was in the OFF mode, it is judged whether the inequality (3) signifying the starting condition of the measurement of the different frequency is satisfied or not, by using the measured result of the reception quality Q_1 at the currently using carrier frequency (step S155). In this, the inequality (3): Q_1<Th_Start. When the condition at the step S155 was not satisfied (NO at the step S155), the operation returns to the step S152.

When the condition at the step S155 was satisfied (YES at the step S155), the flag is set to be "1" (Flag=1) (step S156), and the controller for changing over to different frequency 606 instructs the mobile communication terminal to measure the reception quality Q_2 in the different frequency to which the currently using carrier frequency is changed over (step S157).

When the condition at the step S154 was satisfied (YES at the step S154), that is, it was judged that Flag=1, the controller for changing over to different frequency 606 instructs the mobile communication terminal to measure the reception quality Q_2 in the different frequency to which the currently using carrier frequency is changed over (the step S157).

Next, the inequality (2) is judged (step S158). When the inequality (2) was not satisfied (NO at the step S158), the inequality (4) is judged (step S159). The inequality (4): Q_1>Th_End, the ending condition of the measurement of the different frequency. When the condition at the step S159 was not satisfied (NO at the step S159), the operation returns to the step S152.

When the condition at the step S159 was satisfied (YES at the step S159), the controller for changing over to different frequency 606 instructs the mobile communication terminal to stop measuring the reception quality Q_2 in the different frequency to which the currently using carrier frequency is changed over (step S160). And the operation returns to the step S151.

When the condition at the step S158 was satisfied (YES at the step S158), the controller for changing over to different frequency 606 instructs the mobile communication terminal to stop measuring the reception quality Q_2 in the different frequency to which the currently using carrier frequency is changed over (step S161). And the control changing over to the different frequency is started (step S170).

As mentioned above, according to the first embodiment of the present invention, as shown at the step S153 in FIG. 8, the judging threshold value Th_HO in the inequality (2) is changed corresponding to the moving velocity of the mobile communication terminal and the connecting state whether the mobile communication terminal has been connected to a macro-cell or a micro-cell. In case that the mobile communication terminal has been connected to a macro-cell, when the moving velocity of the mobile communication terminal at the step S152 is high, the judging threshold value Th_HO is made to be a large value, with this, the probability changing over to the different frequency is made to be low. Therefore, it makes difficult that the mobile communication terminal connects to a micro-cell. And in the same case, when the moving velocity of the mobile communication terminal at the step S152 is low, the judging threshold value Th_HO is made to be a small value, with this, the probability changing over to the different frequency is made to be high. Therefore, it makes easy that the mobile communication terminal connects to a micro-cell.

And according to the first embodiment of the present invention, in case that the mobile communication terminal has been connected to a micro-cell, when the moving velocity of the mobile communication terminal at the step S152 is high, the judging threshold value Th_HO is made to be a small value, with this, the probability changing over to the different frequency is made to be high. Therefore, it makes easy that the mobile communication terminal connects to a macro-cell. And in the same case, when the moving velocity of the mobile communication terminal at the step S152 is low, the judging threshold value Th_HO is made to be a large value, with this, the probability changing over to the different frequency is made to be low. Therefore, it makes difficult that the mobile communication terminal connects to a macro-cell.

With the operation mentioned above, at the first embodiment of the present invention, it becomes easy for the mobile communication terminal having high moving velocity to connect to a macro-cell from a micro-cell, and it becomes easy for the mobile communication terminal having low moving velocity to connect to a micro-cell from a macro-cell.

Next, the operation at a method for changing over to a different frequency at a second embodiment of the present invention is explained. The base station controlling apparatus 600 shown in FIG. 5, the base station 700 shown in FIG. 6, and the mobile communication terminal 800 shown in FIG. 7 used at the first embodiment of the present invention are also used at the second embodiment of the present invention.

The operation at the method for changing over to the different frequency at the second embodiment of the present invention is also mainly executed at the controller for changing over to different frequency 606 shown in FIG. 5.

Figure 9:
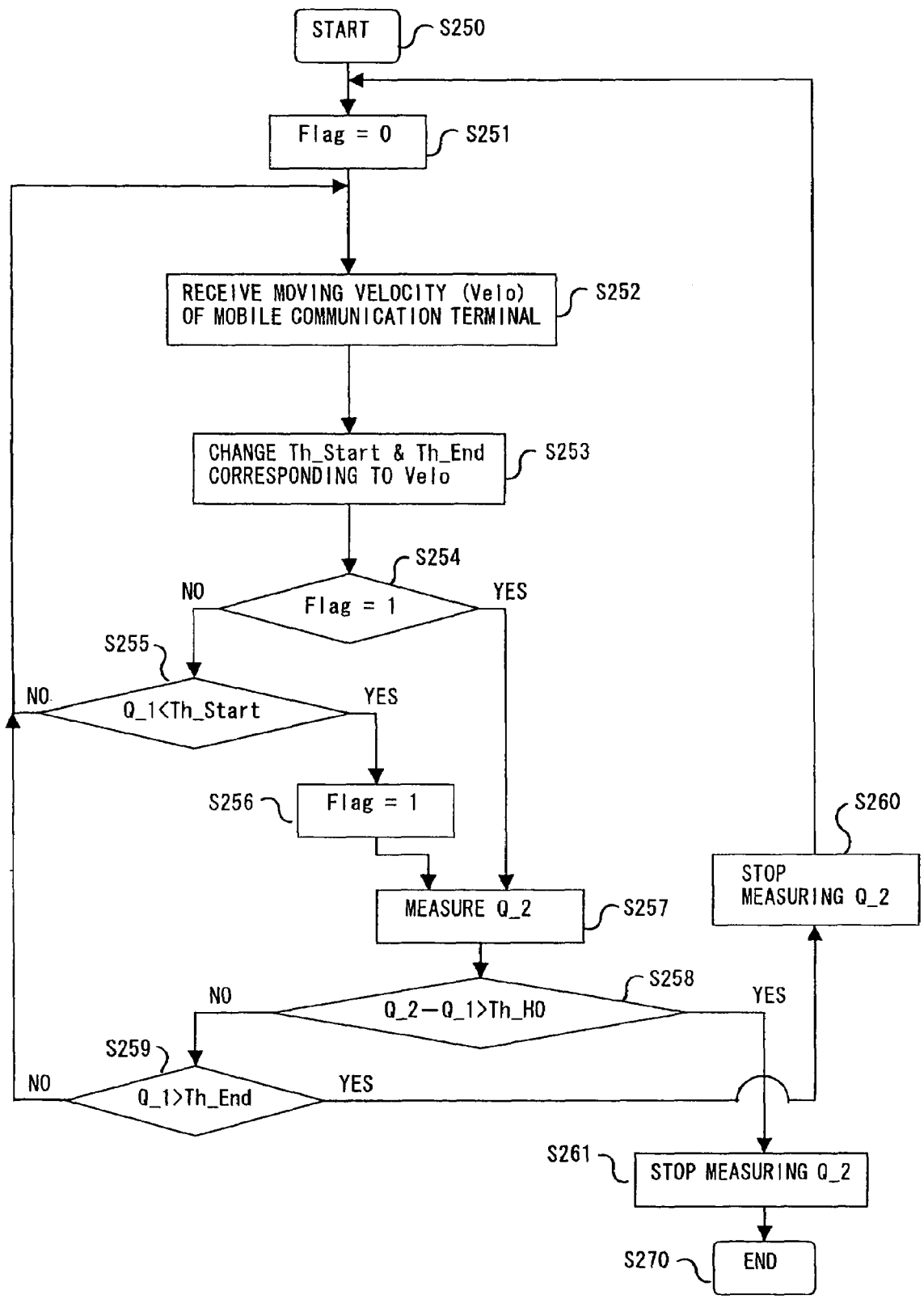
FIG. 9 is a flowchart showing the operation at the controller for changing over to different frequency at a second embodiment of the present invention.

FIG. 9 is a flowchart showing the operation at the controller for changing over to different frequency 606 at the second embodiment of the present invention.

Referring to FIG. 9, the operation at the controller for changing over to different frequency 606 at the second embodiment of the present invention is explained.

First, the control of changing over to a different frequency at the controller for changing over to different frequency 606 is started (step S250). That is, the step S250 shows the starting time of the control of changing over to a different frequency. Next, Flag=0, which signifies that the measurement of the different frequency is in the OFF mode, is set as the initial state (step S251). In this, Flag=1 signifies that the measurement of the different frequency is in the ON mode. That is, the Flag=1 signifies the starting mode of the measurement of the different frequency and the Flag=0 signifies the stopping mode of the measurement of the different frequency.

And the detected result of the moving velocity (Velo) of the mobile communication terminal is received (step S252). And the judging threshold value Th_Start in the inequality (3) and the judging threshold value Th_End in the inequality (4) are changed corresponding to the Velo (step S253). In this, the inequality (3): Q_1<Th_Start, and the inequality (4): Q_1>Th_End.

At the step S252, the moving velocity (Velo) of the mobile communication terminal is actually detected by the number of times of soft hand-over or the number of times of the change of the reception quality. For example, in case that the number of times of the soft hand-over at the mobile communication terminal is large, or the number of times of the change of the reception quality at the mobile communication terminal is large, it can be judged that the mobile communication terminal is moving in the high velocity. On the other hand, in case that the number of times of the soft hand-over at the mobile communication terminal is small, or the number of times of the change of the reception quality at the mobile communication terminal is small, it can be judged that the mobile communication terminal is moving in the low velocity.

At the step S253, the judging threshold values Th_Start and Th_End are actually changed by selecting one of the following two cases.

First, a first case in which the mobile communication terminal has been connected to a macro-cell is explained. In this case, when the moving velocity (Velo) of the mobile communication terminal at the step S252 is high, the judging threshold value Th_Start is changed to be a small value and the judging threshold value Th_End is changed to be a small value. And when the moving velocity (Velo) of the mobile communication terminal is low, the judging threshold value Th_Start is changed to be a large value and the judging threshold value Th_End is changed to be a large value.

Second, a second case in which the mobile communication terminal has been connected to a micro-cell is explained. In this case, when the moving velocity (Velo) of the mobile communication terminal at the step S252 is high, the judging threshold value Th_Start is changed to be a large value and the judging threshold value Th_End is changed to be a large value. And when the moving velocity (Velo) of the mobile communication terminal is low, the judging threshold value Th_Start is changed to be a small value and the judging threshold value Th_End is changed to be a small value. In this, the judging threshold values Th_Start and Th_End satisfy the inequality (5). The inequality (5): Th_End−Th_Start>0.

Next, the flag value (Flag) signifying the ON or OFF mode of the measurement of the different frequency is judged (step S254). That is, that Flag=1 or not is judged at the step S254. When that the Flag=0 was judged at the step S254 (NO at the step S254), that is, it was judged that the measurement of the different frequency was in the OFF mode, it is judged whether the inequality (3) signifying the starting condition of the measurement of the different frequency is satisfied or not, by using the measured result of the reception quality Q_1 at the currently using carrier frequency (step S255). In this, the inequality (3): Q_1<Th_Start. When the condition at the step S255 was not satisfied (NO at the step S255), the operation returns to the step S252.

When the condition at the step S255 was satisfied (YES at the step S255), the flag is set to be "1" (Flag=1) (step S256), and the controller for changing over to different frequency 606 instructs the mobile communication terminal to measure the reception quality Q_2 in the different frequency to which the currently using carrier frequency is changed over (step S257).

When the condition at the step S254 was satisfied (YES at the step S254), that is, it was judged that Flag=1, the controller for changing over to different frequency 606 instructs the mobile communication terminal to measure the reception quality Q_2 in the different frequency to which the currently using carrier frequency is changed over (the step S257).

Next, the inequality (2) is judged (step S258). When the inequality (2) was not satisfied (NO at the step S258), the inequality (4) is judged (step S259). The inequality (4): Q_1>Th_End, the ending condition of the measurement of the different frequency. When the condition at the step S259 was not satisfied (NO at the step S259), the operation returns to the step S252.

When the condition at the step S259 was satisfied (YES at the step S259), the controller for changing over to different frequency 606 instructs the mobile communication terminal to stop measuring the reception quality Q_2 in the different frequency to which the currently using carrier frequency is changed over (step S260). And the operation returns to the step S251.

When the condition at the step S258 was satisfied (YES at the step S258), the controller for changing over to different frequency 606 instructs the mobile communication terminal to stop measuring the reception quality Q_2 in the different frequency to which the currently using carrier frequency is changed over (step S261). And the control changing over to the different frequency is started (step S270).

As mentioned above, according to the second embodiment of the present invention, as shown at the step S253 in FIG. 9, the judging threshold value Th_Start in the inequality (3) and the judging threshold value Th_End in the inequality (4) are changed corresponding to the moving velocity of the mobile communication terminal and the connecting state whether the mobile communication terminal has been connected to a macro-cell or a micro-cell. In case that the mobile communication terminal has been connected to a macro-cell, when the moving velocity of the mobile communication terminal at the step S252 is high, the judging threshold value Th_Start is made to be a low value and the judging threshold value Th_End is made to be a low value. With this, the probability changing over to the different frequency is made to be low. Therefore, it makes difficult that the mobile communication terminal connects to a micro-cell. And in the same case, when the moving velocity of the mobile communication terminal at the step S252 is low, the judging threshold value Th_Start is made to be a large value and the judging threshold value Th_End is made to be a large value. With this, the probability changing over to the different frequency is made to be high. Therefore, it makes easy that the mobile communication terminal connects to a micro-cell.

And according to the second embodiment of the present invention, in case that the mobile communication terminal has been connected to a micro-cell, when the moving velocity of the mobile communication terminal at the step S252 is high, the judging threshold value Th_Start is made to be a large value and the judging threshold value Th_End is made to be a large value. With this, the probability changing over to the different frequency is made to be high. Therefore, it makes easy that the mobile communication terminal connects to a macro-cell. And in the same case, when the moving velocity of the mobile communication terminal at the step S252 is low, the judging threshold value Th_Start is made to be a small value and the judging threshold value Th_End is made to be a small value. With this, the probability changing over to the different frequency is made to be low. Therefore, it makes difficult that the mobile communication terminal connects to a macro-cell.

With the operation mentioned above, at the second embodiment of the present invention, it becomes easy for the mobile communication terminal having high moving velocity to connect to a macro-cell from a micro-cell, and it becomes easy for the mobile communication terminal having low moving velocity to connect to a micro-cell from a macro cell.

Next, a third embodiment of the present invention is explained. At the third embodiment of the present invention, FIGS. 2 and 4 are also used. As mentioned above, in FIG. 4, a case, in which the cellular phone system uses two carrier frequencies in one service area, is shown. In FIG. 4, a mobile communication terminal 30 can connect its channel to any of base stations 10, 11, and 20. In FIG. 4, the number of the mobile communication terminals is one, however, this number is not limited to one and actually plural mobile communication terminals exist in the system, and the number of the base stations is three, however, this number in not limited to three and actually plural base stations exist in the system.

In FIG. 2, the carrier frequencies, which the mobile communication terminal 30 uses in the channel with the base stations 10 and 11, are a carrier frequency 101 at the upstream channel and a carrier frequency 103 at the downstream channel. And the carrier frequencies, which the mobile communication terminal 30 uses in the channel with the base station 20 is a carrier frequency 102 at the upstream channel and a carrier frequency 104 at the downstream channel.

At the first and second embodiments of the present invention, the base station controlling apparatus 60 judged whether the mobile communication terminal 30 connected to the base station 10 or 11, or the base station 20 during the communication of the mobile communication terminal 30. And also the base station controlling apparatus 60 controlled the changing over to the different frequency.

However, at the third embodiment of the present invention, the mobile communication terminal 30 judges whether the mobile communication terminal 30 connects to the base station 10 or 11, or the base station 20 during the communication of the mobile communication terminal 30. And also the mobile communication terminal 30 controls the changing over to the different frequency.

In FIG. 4, the base station 10 belongs to a macro-cell 85, and the base station 20 belongs to a macro-cell 87, and the base station 11 belongs to a micro-cell 86. Further, a micro-cell cellular can be composed of plural micro-cells. In this, the control of the transmission power has been applied to the upstream channel and the downstream channel.

The measurement of the different frequency at the mobile communication terminal 30 is executed by utilizing the data vacant time. The data vacant time is made by the data compression technology. At the data compression technology, the transmission data at the downstream channel are compressed in the time by using a method lowering its diffusion rate or a method making its coding rate higher by that a part of coded data is not transmitted, with this, the data vacant time is made.

At the third embodiment of the present invention, the structure of the base station controlling apparatus and the structure of the mobile communication terminal are different from those at the first and second embodiments of the present invention, but the structure of the base station is the same in all the embodiments. Therefore, the base station controlling apparatus and the mobile communication terminal are explained in detail at the third embodiment of the present invention.

Figure 10:
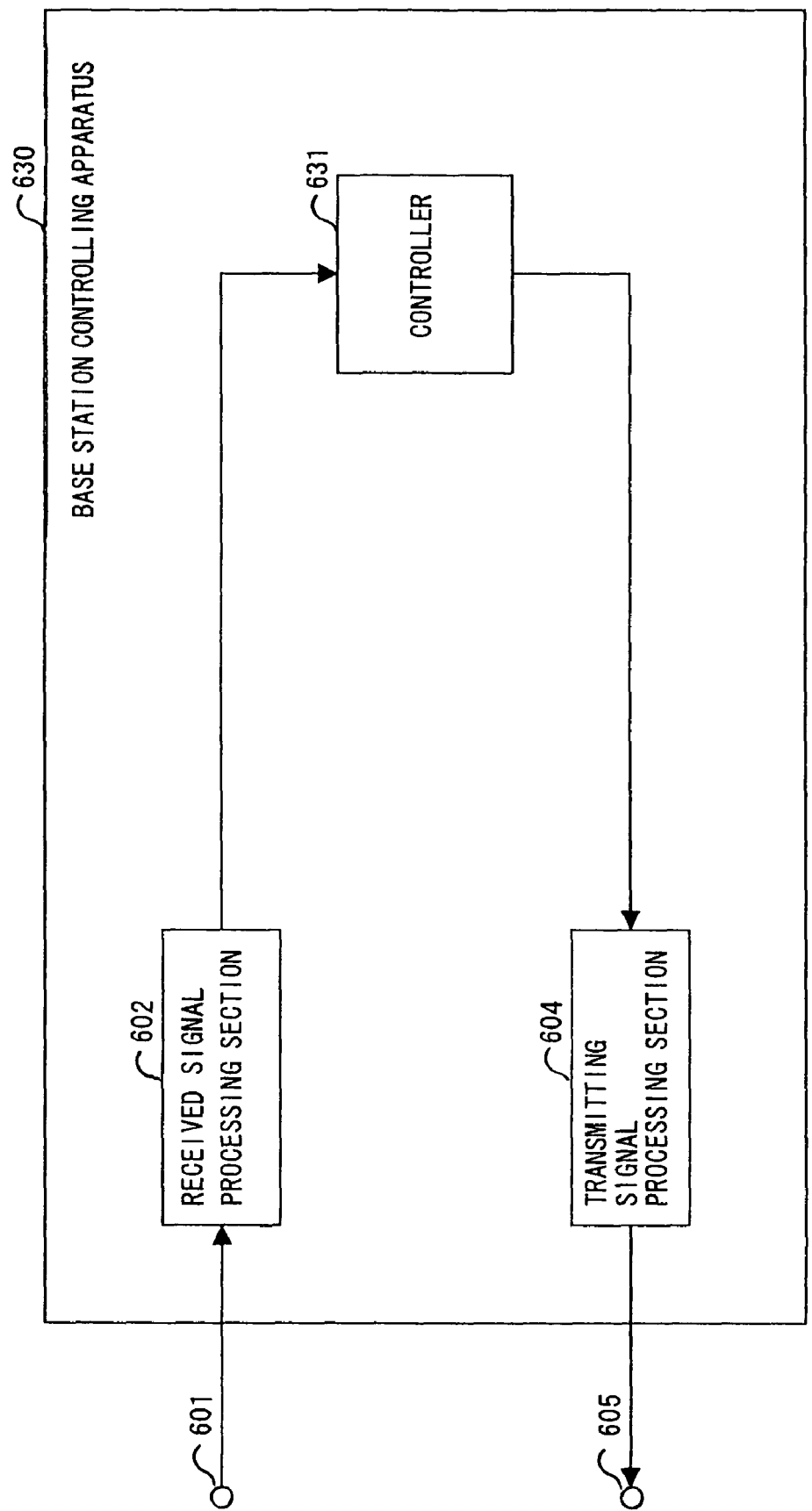
FIG. 10 is a block diagram showing the structure of a base station controlling apparatus at a third embodiment of the present invention.

FIG. 10 is a block diagram showing the structure of a base station controlling apparatus at the third embodiment of the present invention. Referring to FIG. 10, the base station controlling apparatus at the third embodiment of the present invention is explained.

As shown in FIG. 10, a base station controlling apparatus 630 provides an input terminal 601, a received signal processing section 602, a transmitting signal processing section 604, an output terminal 605, and a controller 631. In FIG. 10, the new reference number 630 is attached to the base station controlling apparatus, instead of the reference number 60 in FIG. 4. However, the functions of the base station controlling apparatus are the same those in FIG. 4, except that the base station controlling apparatus 630 does not provide the controller for changing over to different frequency.

At the base station controlling apparatus 630 in the third embodiment of the present invention, compared with the base station controlling apparatus 600 at the first embodiment of the present invention shown in FIG. 5, the base station controlling apparatus 630 does not provide the controller for changing over to different frequency, and provides the controller 631. The functions having the same reference number are the same those at the first embodiment, therefore, the same explanation is omitted.

Therefore, the controller 631 is explained in detail. The controller 631 executes control of channel setting between a base station and a mobile communication terminal. And also the controller 631 receives a request of changing over to a different frequency from the mobile communication terminal, and controls the base station connecting to the mobile communication terminal to change over to the different frequency. Moreover, the controller 631 receives the request of changing over to the different frequency from the mobile communication terminal, and instructs the base station connecting to the mobile communication terminal to make the data vacant time of the individual channel.

Figure 11:
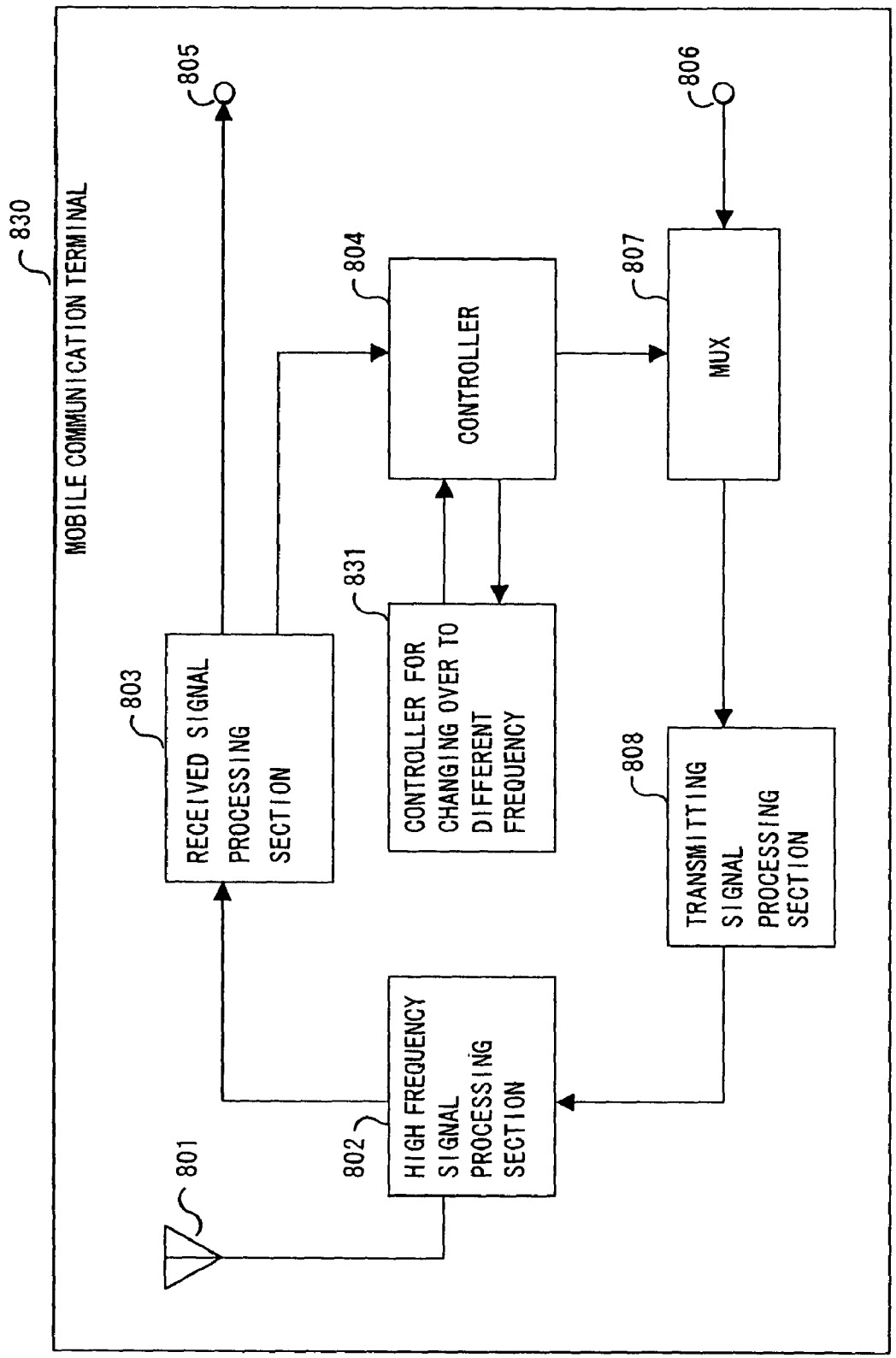
FIG. 11 is a block diagram showing the structure of a mobile communication terminal at the third embodiment of the present invention.

Next, a mobile communication terminal at the third embodiment of the present invention is explained. FIG. 11 is a block diagram showing the structure of the mobile communication terminal at the third embodiment of the present invention. Referring to FIG. 11, the mobile communication terminal at the third embodiment of the present invention is explained.

As shown in FIG. 11, a mobile communication terminal 830 provides an antenna 801, a high frequency signal processing section 802, a received signal processing section 803, a controller 804, an output terminal 805, an input terminal 806, an MUX 807, a transmitting signal processing section 808, and a controller for changing over to different frequency 831. In FIG. 11, the new reference number 830 is attached to the mobile communication terminal, instead of the reference number 30 in FIG. 4, however, the functions of the mobile communication terminal are the same those in FIG. 4, except the controller for changing over to different frequency 831 is added to the mobile communication terminal.

At the mobile communication terminal 830 in the third embodiment of the present invention, compared with the mobile communication terminal 800 at the first embodiment of the present invention shown in FIG. 7, the mobile communication terminal 830 newly provides the controller for changing over to different frequency 831. The functions having the same reference number are the same those at the first embodiment, therefore, the same explanation is omitted.

However, the controller 804 is connected to the controller for changing over to different frequency 831, therefore, the controller 804 is explained in more detail. The controller 804 cyclically measures the broadcast channel transmitted from the base station 700, which were inputted from the received signal processing section 803, and processes information of the measured result for transmitting the information to the base station controlling apparatus 630 shown in FIG. 10. And the controller 804 measures the reception quality of the signals received at the received signal processing section 803, and generates control signals of the transmission power of one or plural base stations. And the controller 804 controls the transmission power based on the information received from the one or plural base stations. Further, the controller 804 has a function to detect the moving velocity of its own mobile communication terminal 830, and informs the controller for changing over to different frequency 831 about the detected velocity information.

The controller for changing over to different frequency 831 is explained in detail. The controller for changing over to different frequency 831 cyclically measures the broadcast channel transmitted from the base station 700, and judges whether the changing over to the different frequency is executed or not based on the measured result. And also the controller for changing over to different frequency 831 receives the information of the moving velocity of the mobile communication terminal from the controller 804 or the base station controlling apparatus in case that the moving velocity is detected by the base station, and changes the judging threshold values using at the control of the changing over to the different frequency.

The main operation at the third embodiment of the present invention is executed at the controller for changing over to different frequency 831 in the mobile communication terminal 830. At the first embodiment of the present invention, the control and the judgement of the changing over to the different frequency is executed at the controller for changing over to different frequency 606 in the base station controlling apparatus 600. However, at the third embodiment of the present invention, the control and the judgement of the changing over to the different frequency is executed at the controller for changing over to different frequency 831 in the mobile communication terminal 830. This is the only difference between the third embodiment and the first embodiment. Therefore, the operation changing over to the different frequency at the third embodiment of the present invention becomes the same that at the first embodiment of the present invention shown in FIG. 8.

Consequently, at the third embodiment of the present invention, the same effect at the first embodiment can be obtained.

Next, a fourth embodiment of the present invention is explained. The structures of the base station controlling apparatus, the base station, and the mobile communication terminal are the same those at the third embodiment. That is, at the fourth embodiment of the present invention, the base station controlling apparatus 630 shown in FIG. 10, the base station 700 shown in FIG. 6, and the mobile communication terminal 830 shown in FIG. 11 are used. However, the operation changing over to the different frequency is executed corresponding to the flowchart shown in FIG. 9 used at the second embodiment of the present invention.

The main operation at the fourth embodiment of the present invention is executed at the controller for changing over to different frequency 831 in the mobile communication terminal 830. At the second embodiment of the present invention, the control and the judgement of the changing over to the different frequency is executed at the controller for changing over to different frequency 606 in the base station controlling apparatus 600. However, at the fourth embodiment of the present invention, the control and the judgement of the changing over to the different frequency is executed at the controller for changing over to different frequency 831 in the mobile communication terminal 830. This is the only difference between the fourth embodiment and the second embodiment. And as mentioned above, the operation changing over to the different frequency at the fourth embodiment of the present invention is executed corresponding to the flowchart shown in FIG. 9.

Consequently, at the fourth embodiment of the present invention, the same effect at the second embodiment can be obtained.

Next, the effects of the present invention are explained. As mentioned above, according to the first embodiment of the present invention, the judging threshold value Th_HO (first threshold value) using at the changing over to the different frequency is changed corresponding to the moving velocity of the mobile communication terminal. At the conventional technology, when the moving velocity of a mobile communication terminal connecting to a micro-cell becomes high, the probability that the mobile communication terminal moves out of the area of the micro-cell becomes high. Consequently, the probability deteriorating the reception quality of the channel becomes high, and the probability generating a call drop becomes high. However, at the first embodiment of the present invention, when the moving velocity of a mobile communication terminal connecting to a micro-cell becomes high, the judging threshold value Th_HO is changed to be a small value, and the probability changing over to the different frequency is made to be high, and it makes easy for the mobile communication terminal to connect to a macro-cell. With this, the probability generating the call drop can be decreased. Further, in case that the cellular phone system is composed of plural micro-cells and a macro-cell covering the plural micro-cells, when the moving velocity of a mobile communication terminal connecting to a micro-cell becomes high, the judging threshold value Th_HO is changed to be a small value, and the probability connecting to the macro-cell becomes high. With this, frequent hand-over among the plural micro-cells becomes small, and the controlling load can be decreased.

And according to the first embodiment of the present invention, when the moving velocity of a mobile communication terminal connecting to a macro-cell becomes low, the judging threshold value Th_HO is changed to be a small value, and the probability changing over to the different frequency to a micro-cell is made to be high. In this, the area of the micro-cell, where a channel can connect, is smaller than that of the macro-cell, therefore, the transmission power requiring to the communication at the channel quality of a certain level can be small. Therefore, the transmission power of the mobile communication terminal can be decreased by connecting from the macro-cell to the micro-cell. Further, since the transmission power of the mobile communication terminal is decreased by connecting to the micro-cell, the interference power to other mobile communication terminals is also decreased, and the probability generating a call drop can be decreased.

As mentioned above, according to the second embodiment of the present invention, the judging threshold value Th_Start (second threshold value) and the judging threshold value Th_End (third threshold value) using at the changing over to the different frequency are changed corresponding to the moving velocity of the mobile communication terminal. At the second embodiment of the present invention, when the moving velocity of a mobile communication terminal connecting to a micro-cell becomes high, the judging threshold value Th_Start is changed to be a large value and the judging threshold value Th_End is changed to be a large value. With this, the probability changing over to the different frequency is made to be high, and it makes easy for the mobile communication terminal to connect to a macro-cell. Consequently, the probability generating the call drop can be decreased. Further, in case that the cellular phone system is composed of plural micro-cells and a macro-cell covering the plural micro-cells, when the moving velocity of a mobile communication terminal connecting to a micro-cell becomes high, the judging threshold value Th_Start is changed to be a large value and the judging threshold value Th_End is changed to be a large value. With this, the probability connecting to the macro-cell becomes high. Consequently, frequent hand-over among the plural micro-cells becomes small, and the controlling load can be decreased.

And according to the second embodiment of the present invention, when the moving velocity of a mobile communication terminal connecting to a macro-cell becomes low, the judging threshold value Th_Start is changed to be a large value and the judging threshold value Th_End is changed to be a large value. With this, the probability changing over to the different frequency to a micro-cell is made to be high. In this, the area of the micro-cell, where a channel can connect, is smaller than that of the macro-cell, therefore, the transmission power requiring to the communication at the channel quality of a certain level can be small. Therefore, the transmission power of the mobile communication terminal can be decreased by connecting from the macro-cell to the micro-cell. Since the transmission power of the mobile communication terminal is decreased by connecting to the micro-cell, the interference power to other mobile communication terminals is also decreased, and the probability generating a call drop can be decreased.

According to the third embodiment of the present invention, the same effect at the first embodiment can be obtained. And according to the fourth embodiment of the present invention, the same effect at the second embodiment can be obtained.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A method for changing over to a different frequency at a cellular phone system, in which a mobile communication terminal, a first base station and a second base station, and a base station controlling apparatus are provided, wherein:
    said first base station communicates with said mobile communication terminal by setting a channel using a first frequency, and
    said second base station communicates with said mobile communication terminal by setting a channel using a second frequency, and
    said mobile communication terminal measures first reception quality in said first frequency during the communication with said first base station by setting a channel, and also
    said mobile communication terminal measures second reception quality in said second frequency corresponding to said measured first reception quality during the communication with said first base station by setting a channel, and
    said mobile communication terminal is controlled to communicate with said second base station by changing over the channel from said first base station to said second base station corresponding to said first and second reception quality, wherein:
    said method for changing over to a different frequency, comprising the step of:
    controlling to change the condition measuring said second reception quality corresponding to the moving velocity of said mobile communication terminal,
    changing a second threshold value and a third threshold value corresponding to said moving velocity of said mobile communication terminal, when said condition measuring said second reception quality is controlled to change; and measuring said second reception quality when said first reception quality is less than said changed second threshold value.

2. A method for changing over to a different frequency at a cellular phone system, in which a mobile communication terminal, a first base station and a second base station, and a base station controlling apparatus are provided, wherein:

said first base station communicates with said mobile communication terminal by setting a channel using a first frequency, and said second base station communicates with said mobile communication terminal by setting a channel using a second frequency, and said mobile communication terminal measures first reception quality in said first frequency and second reception quality in said second frequency during the communication with said first base station by setting a channel, and said mobile communication terminal is controlled to communicate with said second base station by changing over the channel from said first base station to said second base station, when the difference between said second reception quality and said first reception quality exceeds a first threshold value, wherein:

said method for changing over to a different frequency, comprising the step of:

controlling to change said first threshold value corresponding to the moving velocity of said mobile communication terminal, wherein:

said first base station transmits a first broadcast channel and said second base station transmits a second broadcast channel, and said first reception quality is reception quality in said first broadcast channel and said second reception quality is reception quality in said second broadcast channel.

3. A method for changing over to a different frequency at a cellular phone system, in which a mobile communication terminal, a first base station and a second base station, and a base station controlling apparatus are provided, wherein:

said first base station communicates with said mobile communication terminal by setting a channel using a first frequency, and said second base station communicates with said mobile communication terminal by setting a channel using a second frequency, and said mobile communication terminal measures first reception quality in said first frequency and second reception quality in said second frequency during the communication with said first base station by setting a channel, and said mobile communication terminal is controlled to communicate with said second base station by changing over the channel from said first base station to said second base station, when the difference between said second reception quality and said first reception quality exceeds a first threshold value, wherein:

said method for changing over to a different frequency, comprising the step of:

controlling to change said first threshold value corresponding to the moving velocity of said mobile communication terminal, making a data vacant time in which data are not transmitted by compressing transmitting data in the time by said first base station; and measuring said second reception quality in said data vacant time by said mobile communication terminal.

4. A method for changing over to a different frequency at a cellular phone system, in which a mobile communication terminal, a first base station and a second base station, and a base station controlling apparatus are provided, wherein:

said first base station communicates with said mobile communication terminal by setting a channel using a first frequency, and said second base station communicates with said mobile communication terminal by setting a channel using a second frequency, and said mobile communication terminal measures first reception quality in said first frequency and second reception quality in said second frequency during the communication with said first base station by setting a channel, and said mobile communication terminal is controlled to communicate with said second base station by changing over the channel from said first base station to said second base station, when the difference between said second reception quality and said first reception quality exceeds a first threshold value, wherein:

said method for changing over to a different frequency, comprising the step of:

controlling to change said first threshold value corresponding to the moving velocity of said mobile communication terminal, wherein:

said controlling to change said first threshold value corresponding to the moving velocity of said mobile communication terminal is executed at said base station controlling apparatus or said mobile communication terminal.

5. A method for changing over to a different frequency in accordance with claim 1, wherein:

said controlling to change said condition measuring said second reception quality corresponding to the moving velocity of said mobile communication terminal is executed at said base station controlling apparatus or said mobile communication terminal.

6. A cellular phone system in which a mobile communication terminal, a first base station and a second base station, and a base station controlling apparatus are provided, wherein:

said first base station communicates with said mobile communication terminal by setting a channel using a first frequency, and said second base station communicates with said mobile communication terminal by setting a channel using a second frequency, and said mobile communication terminal measures first reception quality in said first frequency during the communication with said first base station by setting a channel, and also said mobile communication terminal measures second reception quality in said second frequency corresponding to said measured first reception quality during the communication with said first base station by setting a channel, and said mobile communication terminal is controlled to communicate with said second base station by changing over the channel from said first base station to said second base station corresponding to said first and second reception quality, wherein:

said cellular phone system, comprising:

a second controlling means for controlling to change the condition measuring said second reception quality corresponding to the moving velocity of said mobile communication terminal, wherein:

said second controlling means, comprising:

a changing means for changing a second threshold value and a third threshold value corresponding to said moving velocity of said mobile communication terminal; and a measuring means for measuring said second reception quality when said first reception quality is less than said changed second threshold value.

7. A cellular phone system in in which a mobile communication terminal, a first base station and a second base station, and a base station controlling apparatus are provided, wherein:

said first base station communicates with said mobile communication terminal by setting a channel using a first frequency, and said second base station communicates with said mobile communication terminal by setting a channel using a second frequency, and said mobile communication terminal measures first reception quality in said first frequency and second reception quality in said second frequency during the communication with said first base station by setting a channel, and said mobile communication terminal is controlled to communicate with said second base station by changing over the channel from said first base station to said second base station, when the difference between said second reception quality and said first reception quality exceeds a first threshold value, wherein:

said cellular phone system, comprising:

a first controlling means for controlling to change said first threshold value corresponding to the moving velocity of said mobile communication terminal, wherein:

said first base station transmits a first broadcast channel and said second base station transmits a second broadcast channel, and said first reception quality is reception quality in said first broadcast channel and said second reception quality is reception quality in said second broadcast channel.

8. A cellular phone system in which a mobile communication terminal, a first base station and a second base station, and a base station controlling apparatus are provided, wherein:

said first base station communicates with said mobile communication terminal by setting a channel using a first frequency, and said second base station communicates with said mobile communication terminal by setting a channel using a second frequency, and said mobile communication terminal measures first reception quality in said first frequency and second reception quality in said second frequency during the communication with said first base station by setting a channel, and said mobile communication terminal is controlled to communicate with said second base station by changing over the channel from said first base station to said second base station, when the difference between said second reception quality and said first reception quality exceeds a first threshold value, wherein:

said cellular phone system, comprising:

a first controlling means for controlling to change said first threshold value corresponding to the moving velocity of said mobile communication terminal, wherein:

said first base station, comprising:

a data vacant time making means for making a data vacant time in which data are not transmitted by compressing transmitting data in the time, and said mobile communication terminal, comprising:

a measuring means for measuring said second reception quality in said data vacant time.

9. A cellular phone system in which a mobile communication terminal, a first base station and a second base station, and a base station controlling apparatus are provided, wherein:

said first base station communicates with said mobile communication terminal by setting a channel using a first frequency, and said second base station communicates with said mobile communication terminal by setting a channel using a second frequency, and said mobile communication terminal measures first reception quality in said first frequency and second reception quality in said second frequency during the communication with said first base station by setting a channel, and said mobile communication terminal is controlled to communicate with said second base station by changing over the channel from said first base station to said second base station, when the difference between said second reception quality and said first reception quality exceeds a first threshold value, wherein:

said cellular phone system, comprising:

a first controlling means for controlling to change said first threshold value corresponding to the moving velocity of said mobile communication terminal, wherein:

said first controlling means is provided in said base station controlling apparatus or said mobile communication terminal.

10. A cellular phone system in accordance with claim 6, wherein:

said second controlling means is provided in said base station controlling apparatus or said mobile communication terminal.

* * * * *